(12) United States Patent
Park et al.

(10) Patent No.: US 12,272,141 B2
(45) Date of Patent: Apr. 8, 2025

(54) DEVICE AND METHOD FOR GENERATING OBJECT IMAGE, RECOGNIZING OBJECT, AND LEARNING ENVIRONMENT OF MOBILE ROBOT

(71) Applicants: YUJIN ROBOT CO., LTD., Incheon (KR); Miele & Cie. KG, Gütersloh (DE)

(72) Inventors: Seong Ju Park, Gunpo-si (KR); Gi Yeon Park, Incheon (KR); Kyu Beom Lee, Incheon (KR)

(73) Assignees: YUJIN ROBOT CO., LTD., Incheon (KR); Miele & Cie. KG, Gutersloh (DE)

( * ) Notice: Subject to any disclaimer, the term of this patent is extended or adjusted under 35 U.S.C. 154(b) by 596 days.

(21) Appl. No.: 17/577,016

(22) Filed: Jan. 17, 2022

(65) Prior Publication Data

US 2022/0139086 A1      May 5, 2022

Related U.S. Application Data

(63) Continuation of application No. PCT/KR2020/009431, filed on Jul. 17, 2020.

(30) Foreign Application Priority Data

Jul. 17, 2019    (KR) ........................ 10-2019-0086265
Oct. 1, 2019    (KR) ........................ 10-2019-0121799
Oct. 16, 2019    (KR) ........................ 10-2019-0128448

(51) Int. Cl.
*G06V 20/50*      (2022.01)
*G05D 1/00*      (2006.01)
(Continued)

(52) U.S. Cl.
CPC .............. *G06V 20/50* (2022.01); *G05D 1/024* (2013.01); *G05D 1/0246* (2013.01);
(Continued)

(58) Field of Classification Search
CPC ........ G06V 20/50; G06V 10/44; G06V 10/46; G06V 10/757; G06V 10/764;
(Continued)

(56) References Cited

U.S. PATENT DOCUMENTS

| | | | |
|---|---|---|---|
| 10,860,034 B1* | 12/2020 | Ziyaee | .................. G06N 3/045 |
| 2010/0228394 A1* | 9/2010 | Yi | ........................ G05D 1/0274 |
| | | | 701/28 |
| 2019/0332115 A1* | 10/2019 | Lim | ........................ B25J 19/02 |

FOREIGN PATENT DOCUMENTS

| | | |
|---|---|---|
| JP | 5822255 B2 | 11/2015 |
| KR | 101826364 B1 | 2/2018 |

(Continued)

*Primary Examiner* — Christopher M Brandt
(74) *Attorney, Agent, or Firm* — BROADVIEW IP LAW, PC

(57) ABSTRACT

According to the present invention, disclosed are a device and a method of generating an object image, recognizing an object, and learning an environment of a mobile robot which perform a deep learning algorithm which allows a robot to create a map and load environment information acquired during the autonomous movement while the autonomous mobile robot is being charged and may be used for an application which finds out a location by finally recognizing objects such as furniture using a method of checking a location of the recognized objects to mark the location on the map.

11 Claims, 26 Drawing Sheets

(51) Int. Cl.
  *G06V 10/44* (2022.01)
  *G06V 10/46* (2022.01)
  *G06V 10/75* (2022.01)
  *G06V 10/764* (2022.01)
  *G06V 10/80* (2022.01)
  *G06V 10/82* (2022.01)
  *G06V 20/70* (2022.01)
  *G06N 3/04* (2023.01)

(52) U.S. Cl.
  CPC ........... *G05D 1/0274* (2013.01); *G06V 10/44* (2022.01); *G06V 10/46* (2022.01); *G06V 10/757* (2022.01); *G06V 10/764* (2022.01); *G06V 10/803* (2022.01); *G06V 10/82* (2022.01); *G06V 20/70* (2022.01); *G06N 3/04* (2013.01)

(58) Field of Classification Search
  CPC ...... G06V 10/803; G06V 10/82; G06V 20/70; G06V 20/58; G05D 1/024; G05D 1/0246; G05D 1/0274; G05D 1/0248; G06N 3/04; G06N 3/045; G06N 3/044; G06N 3/008; G05B 2219/40475; G05B 2219/40564; B25J 9/163; B25J 9/1664; B25J 9/16
  See application file for complete search history.

(56) References Cited

FOREIGN PATENT DOCUMENTS

| | | |
|---|---|---|
| KR | 1020180043606 A | 4/2018 |
| KR | 1020180061949 A | 6/2018 |
| KR | 1020180134230 A | 12/2018 |

* cited by examiner

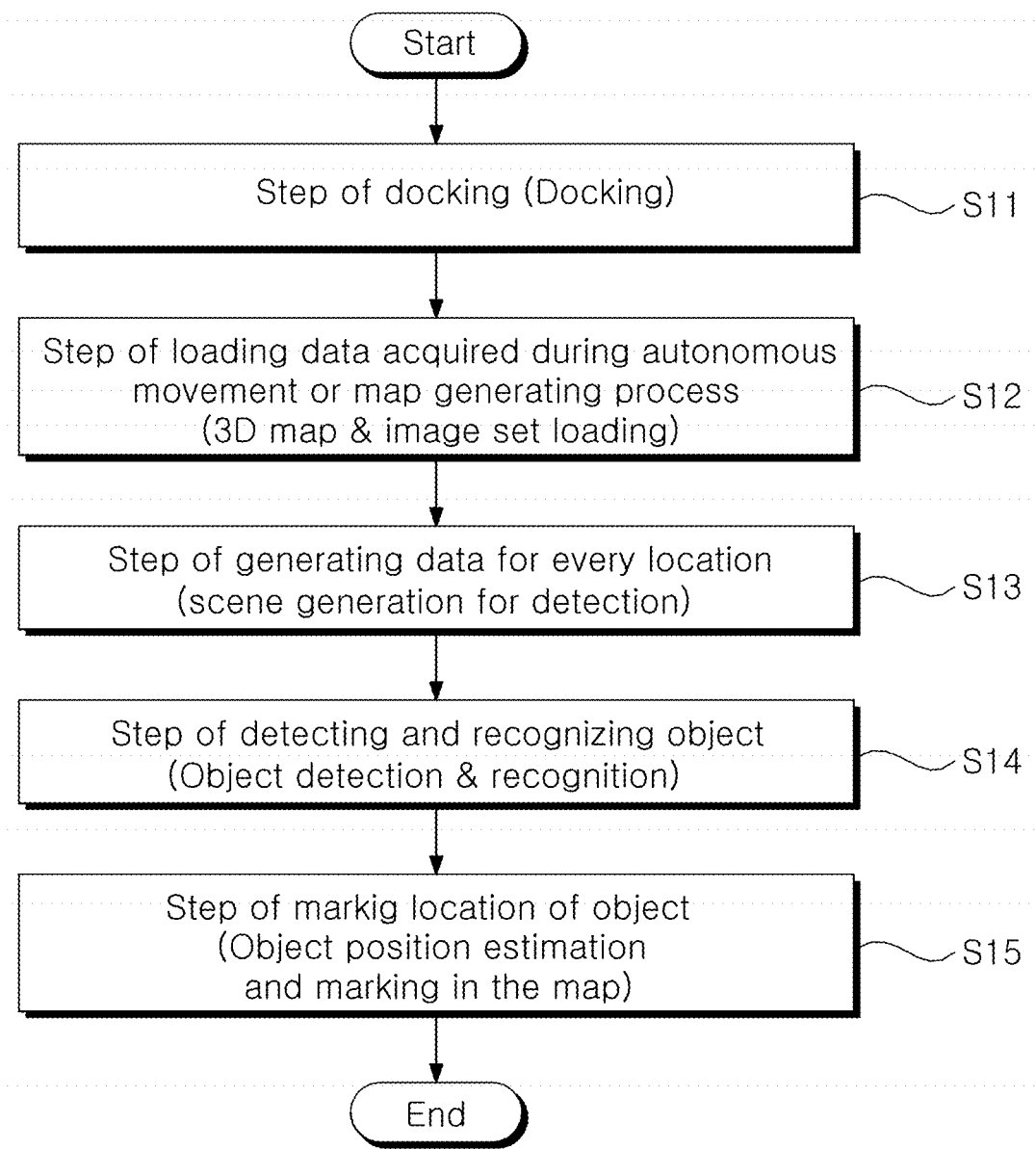

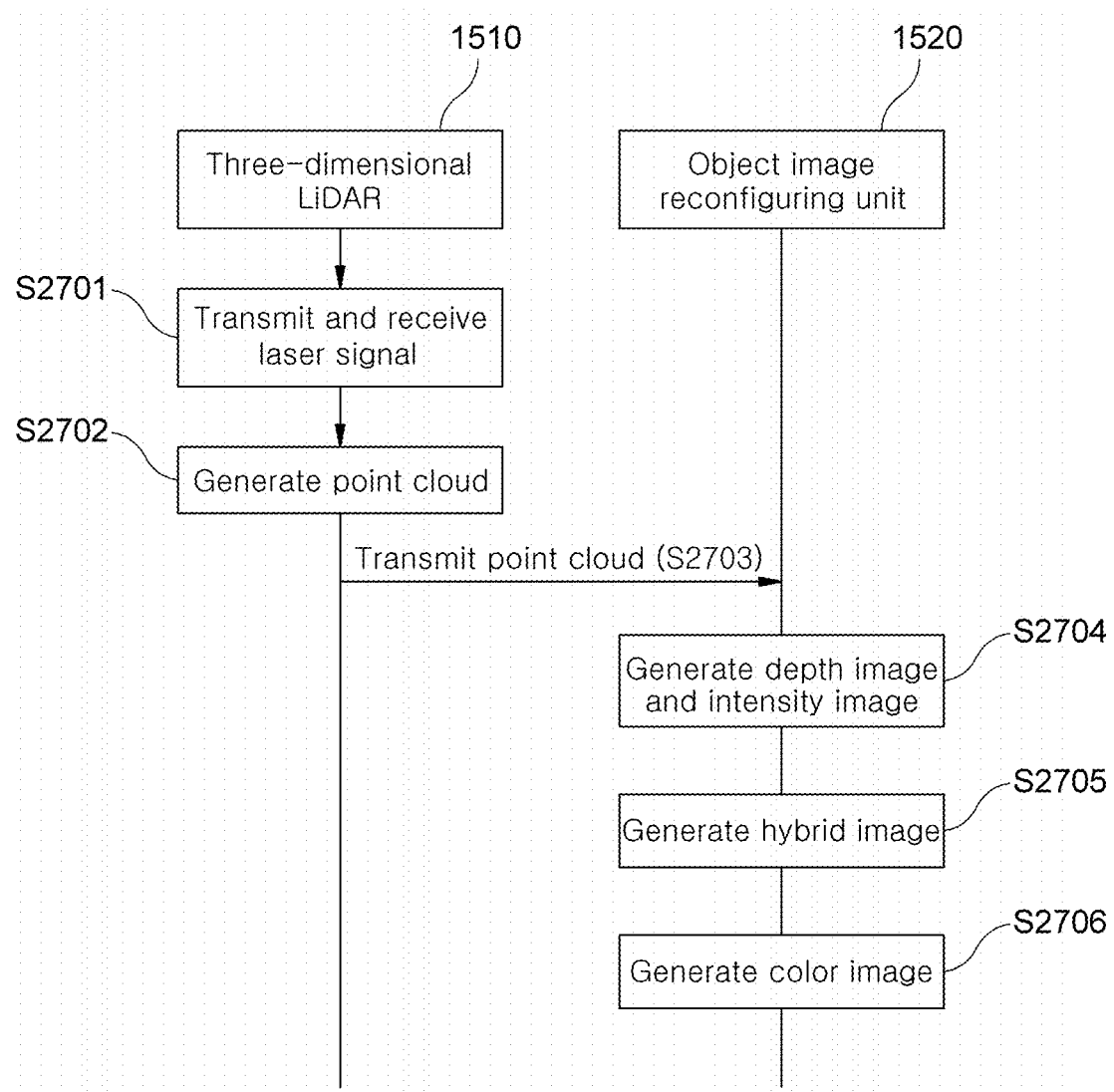

DEVICE AND METHOD FOR GENERATING OBJECT IMAGE, RECOGNIZING OBJECT, AND LEARNING ENVIRONMENT OF MOBILE ROBOT

CROSS-REFERENCE TO RELATED APPLICATIONS

This application is a continuation of pending PCT International Application No. PCT/KR2020/009431, filed on Jul. 17, 2020, which claims priority to and the benefit of Korean Patent Application No. 10-2019-0086265 filed in the Korean Intellectual Property Office on Jul. 17, 2019, Korean Patent Application No. 10-2019-0121799 filed in the Korean Intellectual Property Office on Oct. 1, 2019 and Korean Patent Application No. 10-2019-0128448 filed in the Korean Intellectual Property Office on Oct. 16, 2019, the entire contents of which are incorporated herein by reference.

TECHNICAL FIELD

The present invention relates to an environment learning device of a robot, and more particularly, to an environment learning device and an environment learning method of an autonomous mobile robot. Further, the present invention relates to an object image generating device, a method thereof, and an object recognizing device including the same, and more particularly, to an object image generating device, a method thereof, and an object recognizing device using a three-dimensional LiDAR.

BACKGROUND ART

Robots have been developed for industrial use, and have taken a part of factory automation. Recently, as robot application fields are further expanded, medical robots, aerospace robots, etc. are being developed, and home robots that can be used in general homes are also being made.

A typical example of a home robot is a mobile robot that performs cleaning. In this case, the mobile robot refers to a device which automatically cleans an area to be cleaned by sucking foreign materials such as dust from the floor while autonomously moving in the area to be cleaned. Such a mobile robot detects obstacles located in a cleaning area through various sensors and controls a movement route and a cleaning operation of the mobile robot using the detected result.

In the related art, objects are recognized during the autonomous movement to estimate a location. However, an algorithm which is performed during the autonomous movement requires an additional processor to perform deep learning in addition to a processing power for the autonomous movement.

Accordingly, it is difficult to implement the system with low system specifications and it is also difficult to call or send the robot from or to a desired location while the robot is moving.

DISCLOSURE

Technical Problem

An object of the present invention is to perform a deep learning algorithm which allows a robot to create a map while the autonomous mobile robot is being charged and re-load environment information acquired during the autonomous movement to recognize the environment and to be used for an application which finds out a location by finally recognizing objects such as furniture using a method of checking a location of the recognized objects to mark the location on the map, with an environment learning device and an environment learning method of an autonomous mobile robot.

Therefore, another object is to sufficiently use the process by performing the deep learning algorithm during the charging time and provide a sufficient time by guaranteeing a time for charging.

Further, another object is to implement a system with low system specifications because a separate process for running the deep learning during the movement is not necessary and call or send a robot from or to a desired location without running a deep learning algorithm during the driving of the robot because a location of the object is marked on the map.

Furthermore, in order to solve the problems of the related art described above, still another object of the present invention is to provide an object image generating device, a method thereof, and an object recognizing device including the same which have a high object recognition performance while minimizing a computational complexity to recognize an object based on information acquired from a LiDAR.

Other and further objects of the present invention which are not specifically described can be further considered within the scope easily deduced from the following detailed description and the effect.

Technical Solution

In order to solve the above-described problems, an environment learning device of an autonomous mobile robot according to an embodiment of the present invention includes: a memory which stores environment information which is already acquired by an autonomous mobile robot in a state in which a power is managed to be a predetermined reference or higher and movement map information generated with respect to a moving area where the autonomous mobile robot moves; an environment information acquiring unit which determines feature points to recognize an object located in the moving area using at least some of the environment information and the movement map information stored in the memory and loads the selected environment information in accordance with the determined feature point from the memory; a movement environment recognizing unit which recognizes the object using the selected environment information; and an updating unit which updates the movement map using object information in accordance with the recognized object.

Here, the movement map information includes a plurality of nodes and a link which configure the movement map regarding the moving area and the environment information includes image information on the moving area acquired during the movement; and distance information and reflected light information extracted from three-dimensional point cloud data acquired from an external LiDAR.

Further, the feature point is at least one of a point whenever the autonomous mobile robot moves along a predetermined route, a point when a direction of the autonomous mobile robot is changed, and a point previously determined to recognize the object.

Here, the environment information acquiring unit includes: a feature point determining unit which determines a feature point to recognize an object located in the moving area using at least some of the environment information and the movement map information stored in the memory; and a loading unit which loads the selected environment information in accordance with the determined feature point from the memory.

Here, the feature point determining unit specifies the feature point as a feature node, among nodes which configure the movement map and assigns numbers to nodes in accordance to an order of specifying the feature nodes and the loading unit loads environment information stored when the autonomous mobile robot is located at the feature node, in accordance with an order of the specified feature nodes.

Here, the loading unit includes a LiDAR loading unit which loads distance information and reflected light information extracted from point cloud data acquired from the LiDAR when the autonomous mobile robot is located at the feature node during the movement: and an image data loading unit which loads image information on the moving area acquired from the image information acquiring unit, when the autonomous mobile robot is located in the feature node during the movement.

Here, the movement environment recognizing unit recognizes an object included in a surrounding environment of the feature points using a convolutional neural network (CNN) method.

Here, the movement environment recognizing unit includes: a LiDAR data recognizing unit which recognizes an object included in the surrounding environment of the feature points, based on the distance information and the reflected light information loaded from the LiDAR data loading unit; and an image data recognizing unit which recognizes an object included in the surrounding environment of the feature points, based on the image information loaded from the image data loading unit.

Here, the LiDAR data recognizing unit includes: a first input unit which receives the distance information and the reflected light information acquired from the LiDAR data loading unit; a first shape extracting unit which extracts shapes of the objects included in the surrounding environment of the feature points by combining or filtering cross-sections of candidate objects from points of the point cloud data, based on the distance information and the reflected light information; and a first object recognizing unit which classifies the shapes of the objects in accordance with attributes from the extracted shapes of the objects to recognize the object.

Here, the image data recognizing unit includes: a second input unit which receives the image information acquired from the image data loading unit; a second shape extracting unit which extracts shapes of the objects included in the surrounding environment of the feature points by combining or filtering cross-sections of candidate objects from points of the image information on the moving area included in the image information; and a second object recognizing unit which classifies the shapes of the objects in accordance with attributes from the extracted shapes of the objects to recognize the object.

Here, the movement environment recognizing unit further includes: an object information matching unit which specifically classifies the object information by comparing object information recognized by the LiDAR data recognizing unit and object information recognized by the image data recognizing unit for every coordinate of the feature nodes.

Here, the updating unit updates the movement map by matching a coordinate of the feature node of the recognized object information and a coordinate of the movement map for the moving area.

An environment learning method of an autonomous mobile robot according to another embodiment of the present invention includes: determining feature points to recognize an object located in the moving area using at least some of environment information and movement map information stored in the memory and loading selected environment information in accordance with the determined feature point from a memory, by an environment information acquiring unit; recognizing the object using the selected environment information, by a movement environment recognizing unit; and updating the movement map using object information in accordance with the recognized object, by an updating unit.

Here, the movement map information includes a plurality of nodes and a link which configure the movement map regarding the moving area and the environment information includes image information on the moving area acquired during the movement and three-dimensional point cloud data in accordance with a reflected light signal reflected by an object acquired from an external LiDAR.

Here, the feature point is at least one of a point whenever the autonomous mobile robot moves along a predetermined route, a point when a direction of the autonomous mobile robot is changed, and a point previously determined to recognize the object.

Here, the loading of the selected environment information in accordance with the determined feature point from the memory includes determining a feature point to recognize an object located in the moving area using at least some of the environment information and the movement map information stored in the memory, by a feature point determining unit; and loading the selected environment information in accordance with the determined feature point from the memory, by a loading unit. In the determining of a feature point, the feature point is specified as a feature node, among nodes which configure the movement map and numbers are assigned to nodes in accordance to an order of specifying the feature nodes and in the loading from the memory, the environment information stored when the autonomous mobile robot is located at the feature node is loaded in accordance with the order of specified feature nodes.

Here, the loading from the memory includes: loading distance information and reflected light information extracted from three-dimensional point cloud data acquired from the LiDAR when the autonomous mobile robot is located at the feature node during the movement, by the LiDAR loading unit: and loading image information on the moving area acquired from the image information acquiring unit, when the autonomous mobile robot is located at the feature node during the movement, by the image data loading unit.

Here, the recognizing of an object includes: recognizing an object included in the surrounding environment of the feature points, based on the distance information and the intensity information loaded from the LiDAR data loading unit, by the LiDAR data recognizing unit, recognizing an object included in the surrounding environment of the feature points, based on the image information loaded from the image data loading unit, by an image data recognizing unit, and specifically classifying the object information by comparing object information recognized by the LiDAR data recognizing unit and object information recognized by the image data recognizing unit for every coordinate of the feature nodes, by an object information matching unit.

Here, in the updating of a movement map, the movement map is updated by matching a coordinate of the feature node of the recognized object information and a coordinate of the movement map for the moving area.

An object image generating device according to an embodiment of the present disclosure includes: a three-dimensional LiDAR which receives a reflected light signal reflected by an object and generates a point cloud in accordance with a reflected light signal; and an object image reconfiguring unit which generates a plurality of images obtained by projecting at least a part of the point cloud in a predetermined space in accordance with a distance to the object and an intensity of the reflected light signal and generates a color image reconfigured using the plurality of images.

Further, the plurality of images generated by the object image reconfiguring unit includes: a depth image which defines a distance to the object based on the point cloud; and an intensity image in accordance with the intensity of the reflected light signal and the object image reconfiguring unit reconfigures the depth image and the intensity image in accordance with a predetermined color coordinate system to generate the color image.

Further, the object image reconfiguring unit includes a hybrid image generating unit which mixes the depth image and the intensity image to further generate a hybrid image; and a color image generating unit which generates the color image in accordance with a predetermined color coordinate system using the depth image, the intensity image, and the hybrid image.

Further, the hybrid image generating unit generates the hybrid image by convoluting pixel information of the depth image and pixel information of the intensity image.

Further, the object image reconfiguring unit further includes an image filter unit which performs the filtering to remove a noise of the depth image and the intensity image and an image pre-processing unit which uniformly distributes pixel values of the depth image and the intensity image which are filtered by converting a histogram distribution characteristic for pixel values of the depth image and the intensity image which are filtered to flatten the pixel values and the hybrid image generating unit may mix the flattened depth image and intensity image to generate the hybrid image.

Further, the depth image, the intensity image, and the hybrid image may be two-dimensional black and white images.

Further, the intensity image may represent information about a surface of the object by projecting at least a part of the point cloud into a two-dimensional space in accordance with the intensity of the reflected light signal.

Further, the object image generating device may be installed in a mobile robot which moves and travels a predetermined space.

In order to achieve the above-described object, an object recognizing device according to still another embodiment of the present invention includes a three-dimensional LiDAR which receives a reflected light signal reflected by an object and generates a point cloud in accordance with the reflected light signal; an object image reconfiguring unit which generates a plurality of images obtained by projecting at least a part of the point cloud in a predetermined space in accordance with a distance to the object and an intensity of the reflected light signal and generates a color image reconfigured using the plurality of images; and a processor which recognizes the object using the color image.

Further, the plurality of images generated by the object image reconfiguring unit includes: a depth image which defines a distance to the object based on the point cloud; and an intensity image in accordance with the intensity of the reflected light signal and the object image reconfiguring unit reconfigures the depth image and the intensity image in accordance with a predetermined color coordinate system to generate the color image.

Further, the object image reconfiguring unit includes a hybrid image generating unit which mixes the depth image and the intensity image to further generate a hybrid image; and a color image generating unit which generates the color image in accordance with a predetermined color coordinate system using the depth image, the intensity image, and the hybrid image, and the processor further includes a labeled image generating unit which generates a labeled image obtained by labeling a part of the color image.

Further, the processor inputs the color image and the labeled image to an artificial neural network and recognizes the objects through the artificial neural network, Further, the processor includes: an encoding unit which encodes the color image and the labeled image to convert the images into input feature vectors and transmits the converted input feature vectors to the artificial neural network; and a decoding unit which decodes an output feature vector output from the artificial neural network to recognize objects in the color image, and the artificial neural network includes: an input layer which receives the input feature vectors; a hidden layer which converts the input feature vectors into the output feature vector by convoluting the input feature vectors through hidden nodes which are set with different weights; and an output layer which outputs the output feature vector to the decoding unit.

Further, the hybrid image generating unit generates the hybrid image by convoluting pixel information of the depth image and pixel information of the intensity image.

In order to achieve the above-described object, an object image generating method according to still another embodiment of the present invention includes receiving a reflected light signal reflected by an object and generating a point cloud in accordance with a reflected light signal, by a three-dimensional LiDAR; and generating a plurality of images obtained by projecting at least a part of the point cloud in a predetermined space in accordance with a distance to the object and an intensity of the reflected light signal and generating a color image reconfigured using the plurality of images, by an object image reconfiguring unit.

Advantageous Effects

According to the embodiments of the present invention, as described above, it is possible to perform a deep learning algorithm which allows a robot to create a map and load environment information acquired during the autonomous movement while the autonomous mobile robot is being charged and uses an application which finds out a location by finally recognizing objects such as furniture using a method of checking a location of the recognized objects to mark the location on the map.

Therefore, since the deep learning algorithm is performed during the charging time, the processor may be sufficiently used and since a time for charging is guaranteed, a sufficient spare time may be ensured.

Further, a system may be implemented with low system specifications because a separate process for performing the deep learning during the movement is not necessary and a robot may be called or sent to a desired location without running a deep learning algorithm during the driving of the robot because a location of the object is marked on the map.

Further, the object image generating device, the method thereof, and the object recognizing device including the same according to the embodiment of the present invention convert three-dimensional information acquired from a 3D LiDAR into two-dimensional information to reduce a dimension of the information so that a computational amount and speed which can be driven even in a device with a small computational capacity such as a home cleaning robot may be ensured.

Even if the effects are not explicitly mentioned here, the effects described in the following specification which are expected by the technical features of the present disclosure and their potential effects are handled as described in the specification of the present disclosure.

DESCRIPTION OF DRAWINGS

FIGS. 11 to 14 are flowcharts illustrating an environment learning method of an autonomous mobile robot according to an embodiment of the present invention.

FIG. 27 is a flowchart illustrating an object image generating method according to an embodiment of the present disclosure in accordance with a time flow.

BEST MODE

Figure 1:
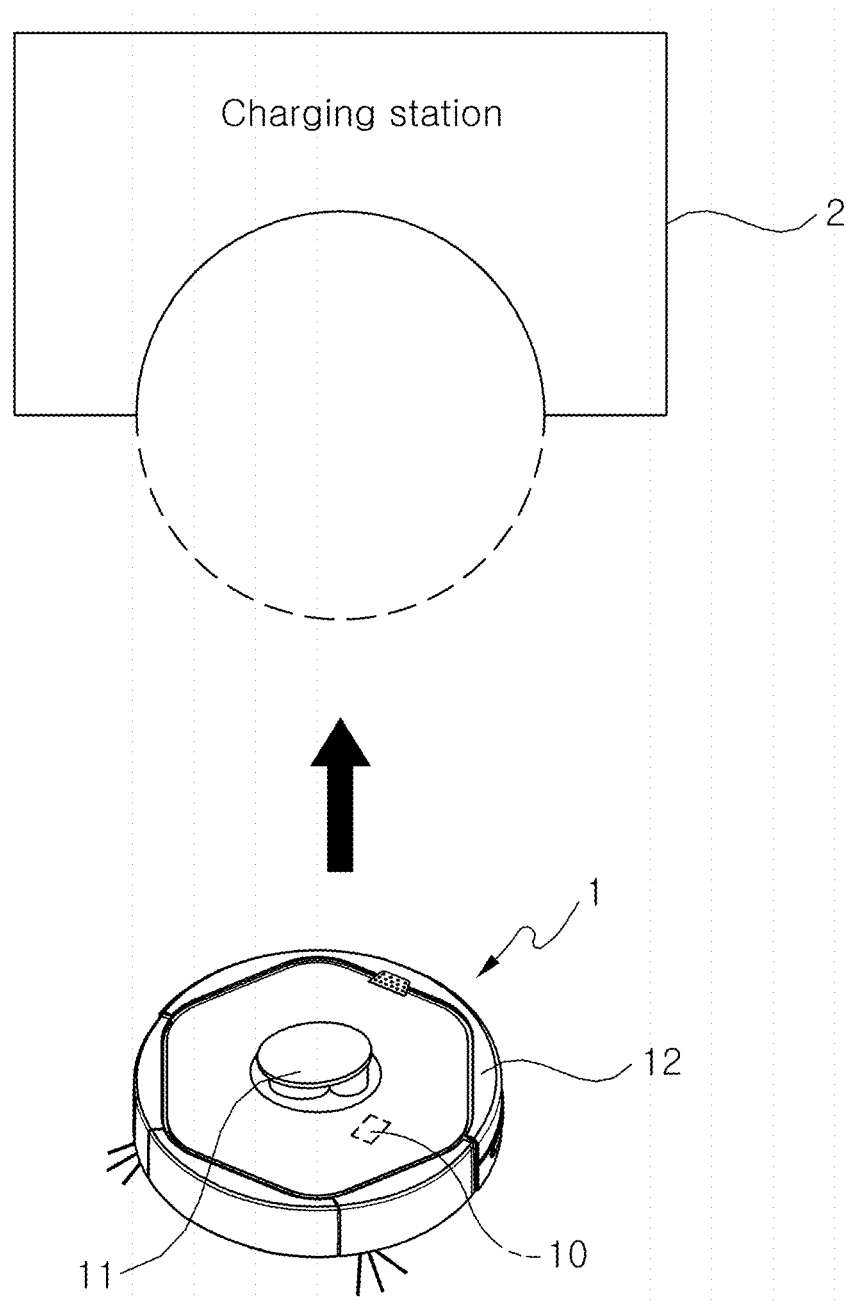
FIG. 1 is a view schematically illustrating a system of an autonomous mobile robot according to an embodiment of the present invention.

Hereinafter, an environment learning device and an environment learning method of an autonomous mobile robot regarding the present invention will be described in more detail with reference to the drawings. However, the present invention can be realized in various different forms, and is not limited to the exemplary embodiments described herein. In order to clearly describe the present invention, a part which may obscure the present invention may be omitted and like reference numerals denote like components.

It should be understood that, when it is described that an element is "coupled" or "connected" to another element, the element may be directly coupled or directly connected to the other element or coupled or connected to the other element through a third element.

Further, such as "module" and a "unit", suffixes for components used in the following description are given or mixed and used by considering easiness in preparing a specification and do not have a meaning or role distinguished from each other in themselves.

Terms such as first or second may be used to describe various components but the components are not limited by the above terms. The above terms are used only to discriminate one component from the other component.

Hereinafter, an environment learning device and an environment learning method of an autonomous mobile robot will be described in detail with reference to relevant drawings.

FIG. 1 is a view schematically illustrating a system of an autonomous mobile robot according to an embodiment of the present invention.

As illustrated in FIG. 1, a system of an autonomous mobile robot according to an embodiment of the present invention may include an autonomous mobile robot 1 and a docking station 2 for charging the mobile robot.

The autonomous mobile robot 1 refers to a movable cleaning robot and for example, moves a predetermined space, for example, homes, public organizations, offices to automatically clean the space.

The autonomous mobile robot 1 includes a LiDAR 11 and an image information acquiring unit 12 mounted inside or outside.

The 3D LiDAR 11 may be implemented as a laser radar having a distance range which detects distant objects, a viewing angle range such as azimuth and elevation, and an excellent spatial resolution. The LIDAR is a device which transmits a laser signal, measures a returning time of the reflected signal, and measures a distance to a reflector using a speed of light. The laser signal is converted into an electrical signal by a photo diode. The laser signal may have a predetermined wavelength band.

The three-dimensional LiDAR 11 of the present invention transmits and receives an optical signal using a pair of light sources and a photo diode and three-dimensionally scans surroundings using a movable mirror and a rotor. The three-dimensional LiDAR 11 may operate by a time of flight (TOF) manner. According to the time of flight manner, a laser emits a pulsed or square wave signal to measure a time when reflection pulses or square wave signals from objects within a measurement range reach a receiver to measure a distance between an object to be measured and the distance measuring device.

In the present invention, since the laser signal irradiated by the three-dimensional LiDAR 11 is irradiated with very narrow intervals while moving vertically and horizontally, distance information in accordance with the laser signal reflected by the objects are collected to acquire three-dimensional information of a surrounding environment of the three-dimensional LiDAR.

According to an embodiment, the three-dimensional LiDAR 11 of the present invention is installed on a top surface of the mobile robot to transmit and receive a laser signal in a predetermined periodic interval to and from the surrounding environment in a range of 360 degrees while autonomously rotating to acquire a point cloud including information about the object. Further, the mobile robot is fixed in a location where the mobile robot recognizes an object or moves at a timing for recognizing the object to transmit or receive the laser signal.

The image information acquiring unit 12 may include various sensors such as a camera, a laser scanner, or an ultrasonic sensor and create a map for a predetermined space based on the acquired data, for example, for an entire area to be cleaned while moving in homes, public organizations, offices and suck foreign materials such as dust from the floor while autonomously moving an area to be cleaned based on the created map without the manipulation of the user to automatically clean an area to be cleaned.

The environment learning device 10 of the autonomous mobile robot according to the embodiment of the present invention is implemented by a processor in the autonomous mobile robot 1 and uses environment information acquired by the LiDAR 11 and the image information acquiring unit 12. Further, the environment learning device 10 includes a memory which stores environment information acquired during the movement and movement map information generated with regard to a moving area where the autonomous mobile robot moves.

Here, the movement map information includes a plurality of nodes and links which configure the movement map related to the moving area and the environment information includes image information on the moving area acquired during the movement and distance information and reflected light information extracted from 3-dimensional point cloud data acquired from an external LiDAR.

In this case, the autonomous mobile robot 1 may generate a map using a simultaneous localization and mapping (SLAM) technique. Here, the SLAM technique refers to a technique which recognizes a location with an existing map or creates a map by knowing a location and also simultaneously figures out a location and constructs a map to complement to each other.

The autonomous mobile robot 1 autonomously moves in an area to be cleaned to automatically clean the area and then moves to a docking station 2 to charge or empty the dust stored in the robot cleaner.

A signal processing unit (not illustrated) determines a moving mode or a movement route of the autonomous mobile robot using the environment information acquired by the image information acquiring unit 12 and processes an operation related to the moving area and a user command.

The docking station 2 sends a docking guide signal to the front side and when the autonomous mobile robot 1 is docked in accordance with the sent docking guide signal, charges the docked autonomous mobile robot 1.

In this case, when the mobile robot starts to be charged in the docking station, the docking station 2 may stop or block the transmission of the docking guide signal which guides the mobile signal.

The docking station 2 performs not only a function of sending a signal to smoothly guide a mobile robot to the docking station usually, but also a function of supplying a power to the mobile robot by connecting an external power source to the mobile robot when the mobile robot is connected, a function of displaying a status indicating whether a power is turned on by a user, the mobile robot is being charged, or the charging is completed, a function of supplying a guide signal, displaying a status, and supplying an external power using a power of a power supplier, and a function of receiving a power from an external AC input to convert the power into a power for a docking station operation.

Further, when the autonomous mobile robot 1 starts to be charged in the docking station, the docking station 2 may block the displaying of a charging status on a status display unit and even though the charging is completed, if the autonomous mobile robot 1 is docked, blocks a charging status display through the status display unit.

Figure 2:
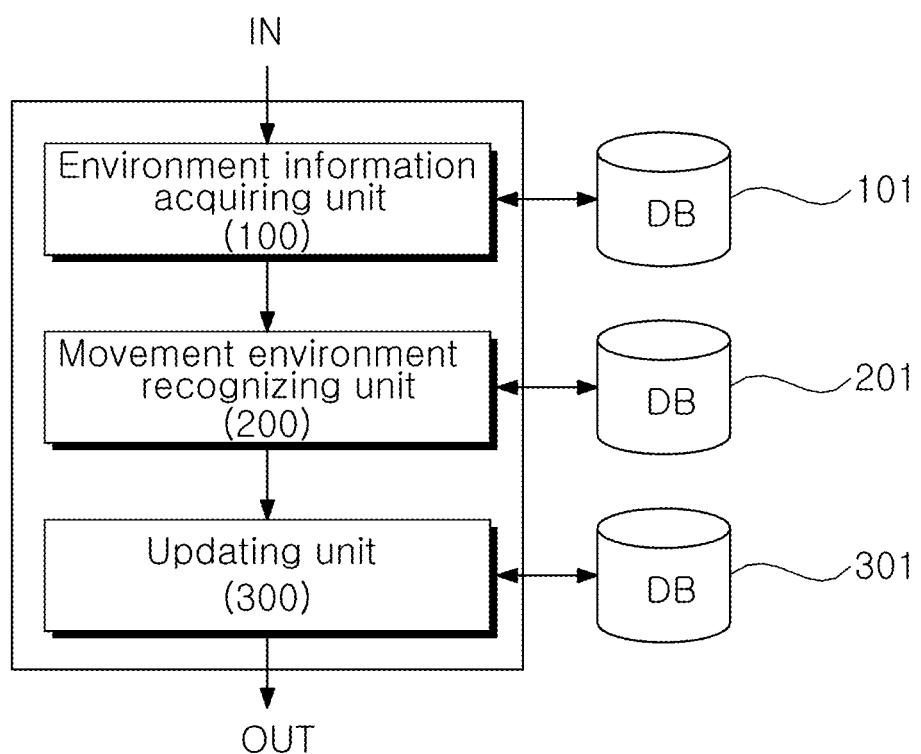
FIG. 2 is a block diagram illustrating an environment learning device of an autonomous mobile robot according to an embodiment of the present invention.

FIG. 2 is a block diagram illustrating an environment learning device of an autonomous mobile robot according to an embodiment of the present invention.

Referring to FIG. 2, the environment learning device 10 of an autonomous mobile robot according to an embodiment of the present invention includes an environment information acquiring unit 100, a movement environment recognizing unit 200, and an updating unit 300.

The environment learning device 10 of the autonomous mobile robot is a device for applying a function of recognizing an object and an environment to an autonomous mobile robot which needs to perform the autonomous moving and charging.

The autonomous mobile robot can be used for an application which finally recognizes objects such as furniture to find out the location using the environment learning device.

Here, the autonomous mobile robot may include autonomous mobile robots such as a cleaning robot, a logistics robot, and a service robot and an autonomous mobile robot which requires charging.

In the related art, objects are recognized during the autonomous movement to estimate a location. However, an algorithm which is performed during the autonomous movement requires an additional processor to perform deep learning in addition to a processing power for the autonomous movement.

The environment learning device 10 of an autonomous mobile robot according to the embodiment of the present invention executes a deep learning algorithm which allows a robot to create a map after charging the robot and load environment information acquired during the autonomous movement to recognize the environment, in a state in which the autonomous movement finishes, and checks the locations of the recognized objects to mark the locations on the map.

Therefore, since the deep learning algorithm is executed during the charging time, the processor may be sufficiently used and since a time for charging is guaranteed, a sufficient spare time may be ensured.

Further, a system may be implemented with low system specifications because a separate process for running the deep learning during the movement is not necessary and a robot may be called or sent from or to a desired location without running a deep learning algorithm during the driving of the robot because a location of the object is marked on the map.

The environment information acquiring unit 100 determines feature points for recognizing an object located in the moving area and loads selected environment information in accordance with the determined feature points from the memory, using at least some of environment information which is already acquired by the autonomous mobile robot in a state in which a power is managed by a predetermined reference or higher during the movement, the environment information and the movement map information stored in the memory 101 which stores the movement map information generated with regard to the moving area where the autonomous mobile robot moves.

The predetermined reference refers to a case when the robot is being charged in the docking station, a case when a charged amount of the battery is higher than a predetermined reference level, and a case when a power of a reference level or higher remains in consideration of a remaining movement route of the moving mobile robot.

In the embodiment of the present invention, when a charging mode command is input, it is determined as a state for learning environment information. When the autonomous mobile robot is docked to the charging station, the charging mode command stops the moving process and starts the charging process and an algorithm of the environment learning device is performed during the charging process. When a charging mode command is transmitted from a controller (not illustrated), the charging starts and when a moving mode command is transmitted, the charging stops and the autonomous movement starts.

In addition to a state in which the charging mode command is input, if the power can be managed to be a predetermined reference or higher by those skilled in the art, the process of the environment learning device may be performed.

Here, the movement map information includes a plurality of nodes and links which configure the movement map related to the moving area and the environment information includes image information on the moving area acquired during the movement and distance information and reflected light information extracted from three-dimensional point cloud data acquired from an external LiDAR.

Further, the feature point is at least one of a point whenever the autonomous mobile robot moves along a predetermined route, a point when a direction of the autonomous mobile robot is changed, and a point previously determined to recognize the object.

Here, the point previously determined to recognize the object refers to a point corresponding to a location where the object is most satisfactorily recognized, for example, a point where a center of the object is recognized or a point where a characteristic appearance of the object is clearly visible, or a point where an edge feature point (the most edge feature points) is easily extracted from the object. The edge may be extracted using a method of detecting an edge area using a sobel filter.

The environment information is data for every location of the point to perform object detection and recognition and the environment information acquiring unit 100 allows a virtual robot to instantaneously acquire data from information or a map such as a map which is created in advance and a LiDAR image while moving around.

Information including the environment information and the movement map information may be stored in memories 101, 102, and 103 and the memories may be included in the device or combined.

The movement environment recognizing unit 200 recognizes the object using the selected environment information.

Here, the selected environment information refers to environment information acquired from feature points which are determined to recognize an object among the environment information and the object detection and recognition are performed using the acquired environment information.

The updating unit 300 updates the movement map using the object information in accordance with the recognized object.

Here, for example, when the recognized object is a fixed table, the object information may include object recognition information indicating that the object is a "table", location information regarding a location of the table, and mobility information indicating that the table is mainly fixed to be used.

The updating unit 300 matches the recognized object and the map information to estimate a location on the map. Specifically, the movement map is updated by marking a category and information of the object in a location of the object recognized on a map of the object recognized by matching a coordinate of a corresponding feature node of the recognized object information and a coordinate of a movement map for the moving area.

When a process of recognizing an object for the entire map and marking on the map finishes, the process is completed.

Further, a system may be implemented with low system specifications because a separate process for running the deep learning during the movement is not necessary and a robot may be called or sent from or to a desired location without running a deep learning algorithm during the driving of the robot because a location of the object is marked on the map.

According to another exemplary embodiment of the present invention, the mobile robot of the present invention may further include a battery driver which manages information regarding a charging status of the battery and controls the battery to be charged or discharged. The battery driver not only controls an operation of the battery, but also generates and manages charging status information including a remaining charging amount of the battery and information about whether the battery is currently being charged or discharged or in a power save mode. The processor may determine a learning mode in consideration of a power status and a subject to be trained. The learning mode may include a point cloud based learning mode, an image based learning mode, and a convergence mode. Here, in the point cloud based learning mode, the processor performs a process which extracts a feature value based on a CNN neural network with position information and reflected light information according to the point cloud as inputs and performs object classification to recognize an object. In the image based learning mode, the processor performs a process which extracts a feature value from an input image acquired by the camera and recognizes the object by the object classification. In the convergence mode, the processor performs learning about the point cloud information and learning about the image information in parallel. The processor determines an object to be updated based on each object recognition information and projects point cloud information of the determined object onto the image to update the object information. The processor adds updated information about the object to a previously stored movement map to generate an updated movement map.

Figure 3:
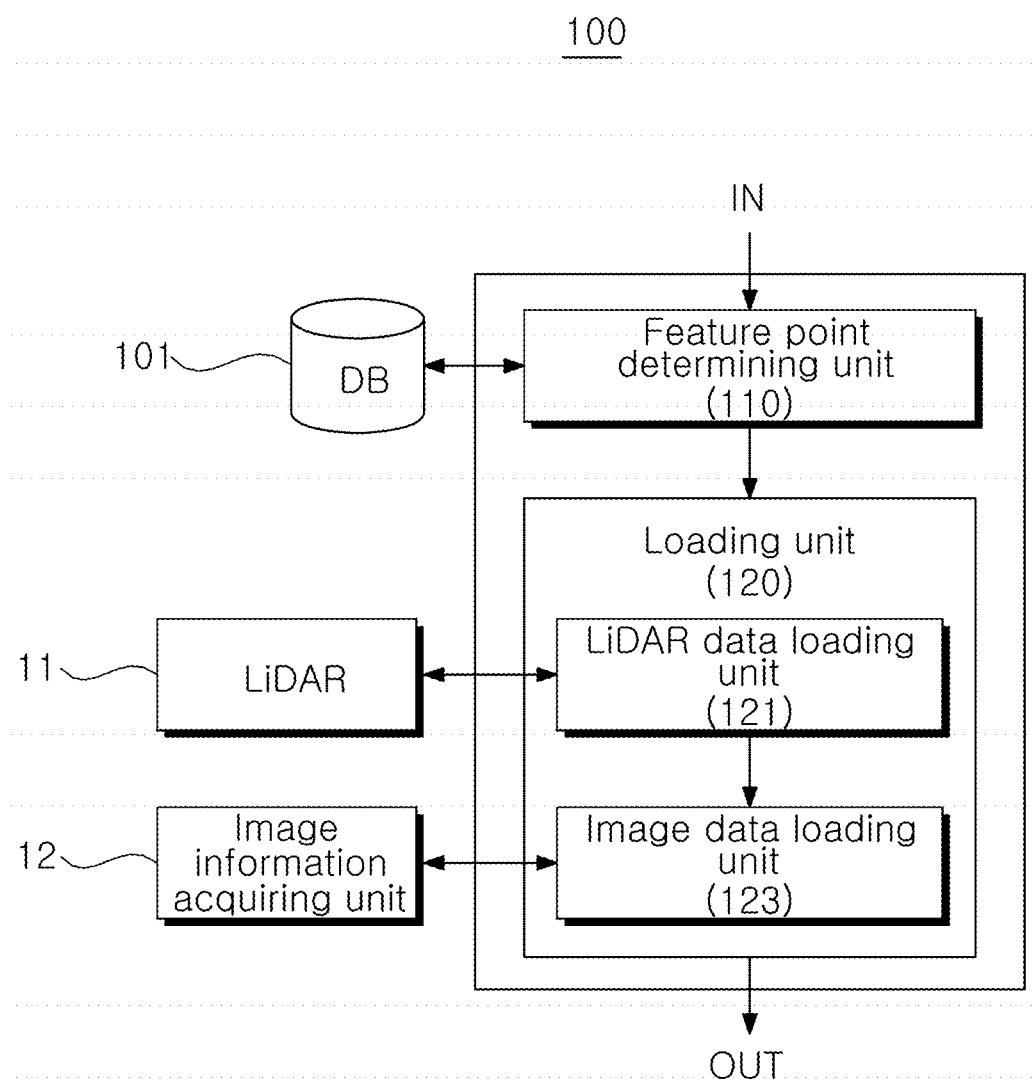
FIG. 3 is a block diagram illustrating an environment information acquiring unit of an environment learning device of an autonomous mobile robot according to an embodiment of the present invention.

FIG. 3 is a block diagram illustrating an environment information acquiring unit of an environment learning device of an autonomous mobile robot according to an embodiment of the present invention.

Referring to FIG. 3, the environment information acquiring unit 100 of the autonomous mobile robot according to the embodiment of the present invention includes a feature point determining unit 110 and a loading unit 120.

The environment information acquiring unit 100 generates data acquired at a moment when the robot passes the location, among data acquired during the movement of the autonomous mobile robot and acquires the location of the robot and all data generated at that time while replaying the stored data to convert the data to perform the object detection and recognition.

The environment information acquiring unit 100 determines feature points for recognizing an object located in the moving area and loads selected environment information in accordance with the determined feature points from the memory, using at least some of environment information which is already acquired by the autonomous mobile robot in a state in which a power is managed by a predetermined reference or higher during the movement, the environment information and the movement map information stored in the memory which stores the movement map information generated with regard to the moving area where the autonomous mobile robot moves.

When the autonomous mobile robot is docked to the charging station to be charged and starts charging, the environment information acquiring unit 100 turns off a process for autonomous movement of the robot and turns on a process for object detection and recognition.

Here, the movement map information includes a plurality of nodes and links which configure the movement map related to the moving area and the environment information includes image information on the moving area acquired during the movement and distance information and reflected light information extracted from three-dimensional point cloud data acquired from an external LiDAR.

The movement map may be a three-dimensional map or a two-dimensional map, the image information on the moving area may be image data, and the data acquired from the LiDAR may be three-dimensional or two-dimensional LiDAR data.

The feature point determining unit 110 determines a feature point to recognize an object located in the moving area using at least some of the environment information and the movement map information stored in the memory.

Specifically, the feature point determining unit 110 specifies the feature point as a feature node, among nodes which configure the movement map and assigns numbers to nodes in accordance to an order of specifying the feature nodes.

The loading unit 120 loads the selected environment information in accordance with the determined feature point from the memory and loads environment information stored when the autonomous mobile robot is located at the feature node in accordance with the order of the specified feature nodes.

Specifically, the loaded environment information includes a map, point cloud information, an image, or image information and the map is a three-dimensional or two-dimensional map. The point cloud information is distance (range) information and reflected light (intensity) information and the image or the image information is images taken while the robot moves.

The loading unit 120 includes a LiDAR data loading unit 121 and an image data loading unit 123.

The LiDAR data loading unit 121 loads the distance information and the reflected light information extracted from three-dimensional point cloud data acquired from the LiDAR when the autonomous mobile robot is located at the feature node during the movement.

The image data loading unit 123 loads the image information on the moving area acquired from the image information acquiring unit 12 when the autonomous mobile robot is located at the feature node during the movement.

A data converting unit which converts the loaded environment information into a format which performs object detection and recognition may be further provided.

Figure 4:
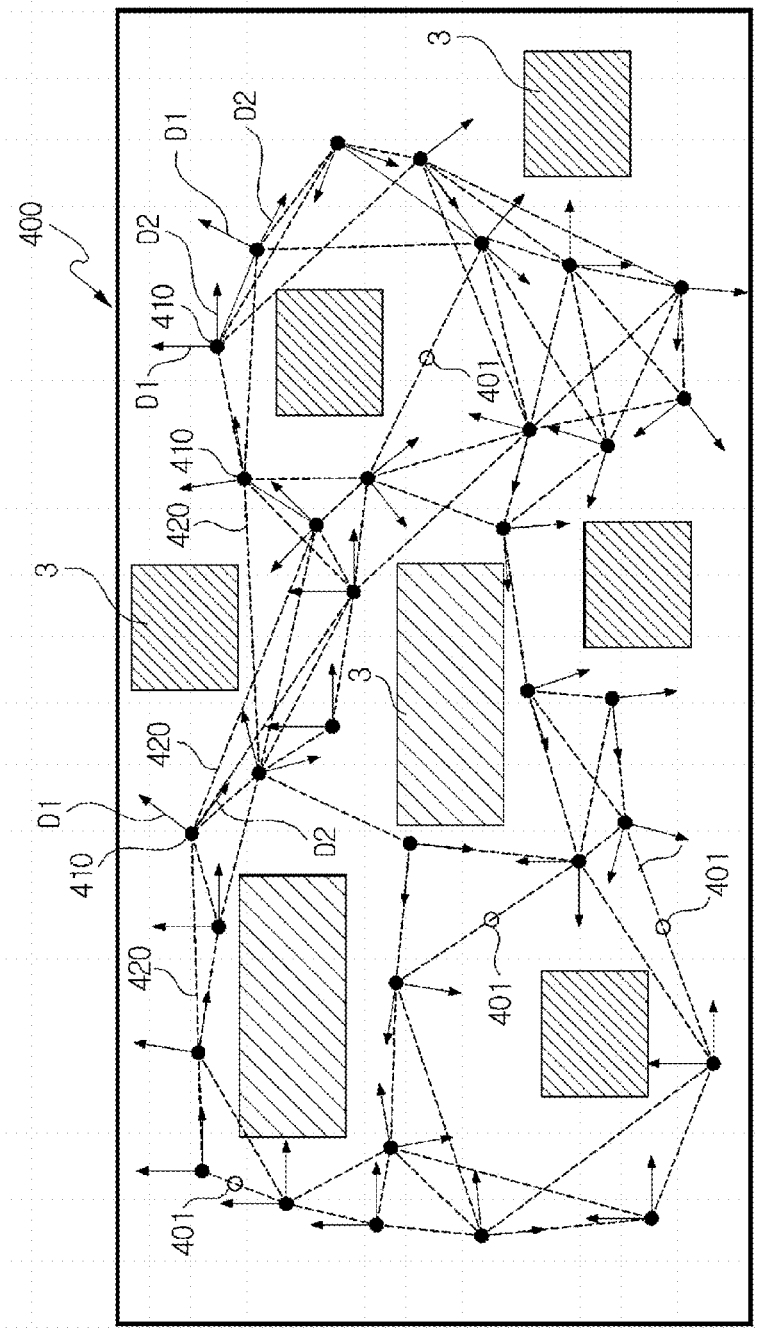
FIGS. 4 to 6 are views for explaining movement map information of an environment learning device of an autonomous mobile robot according to an embodiment of the present invention.
Figure 5:
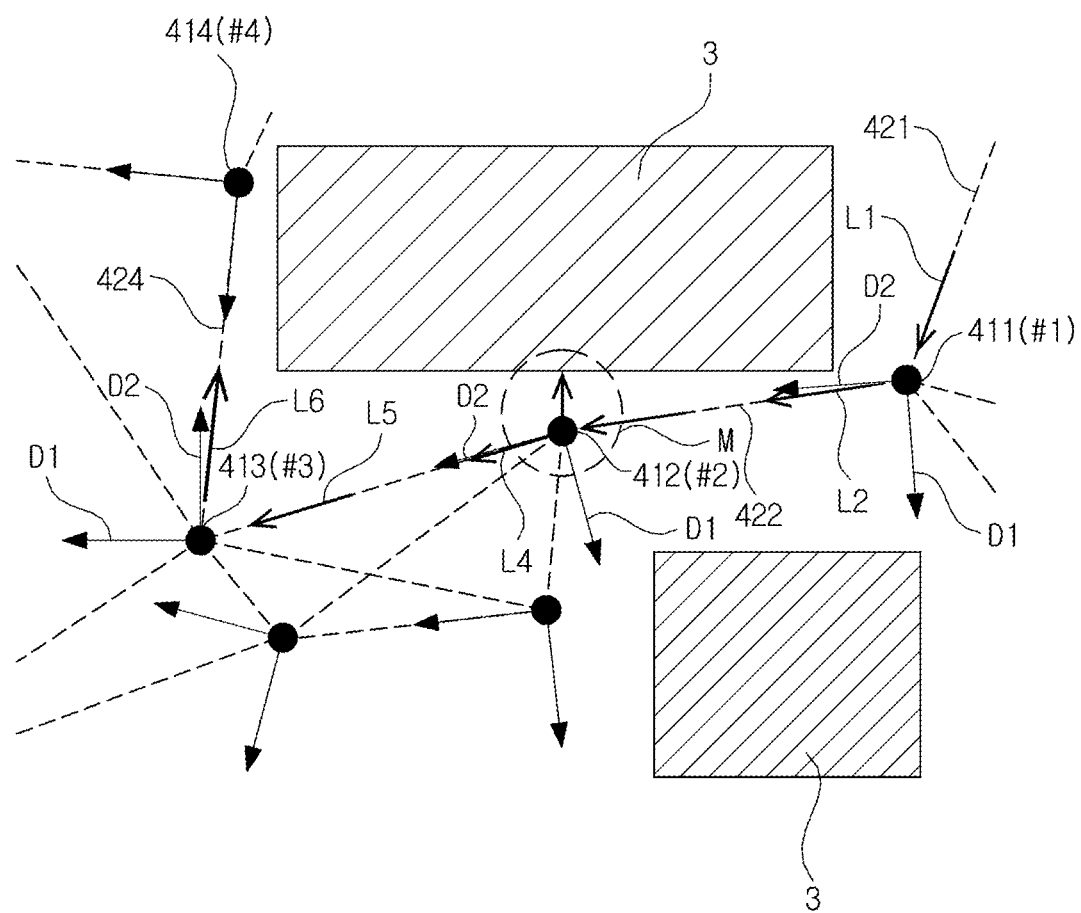
Figure 6:
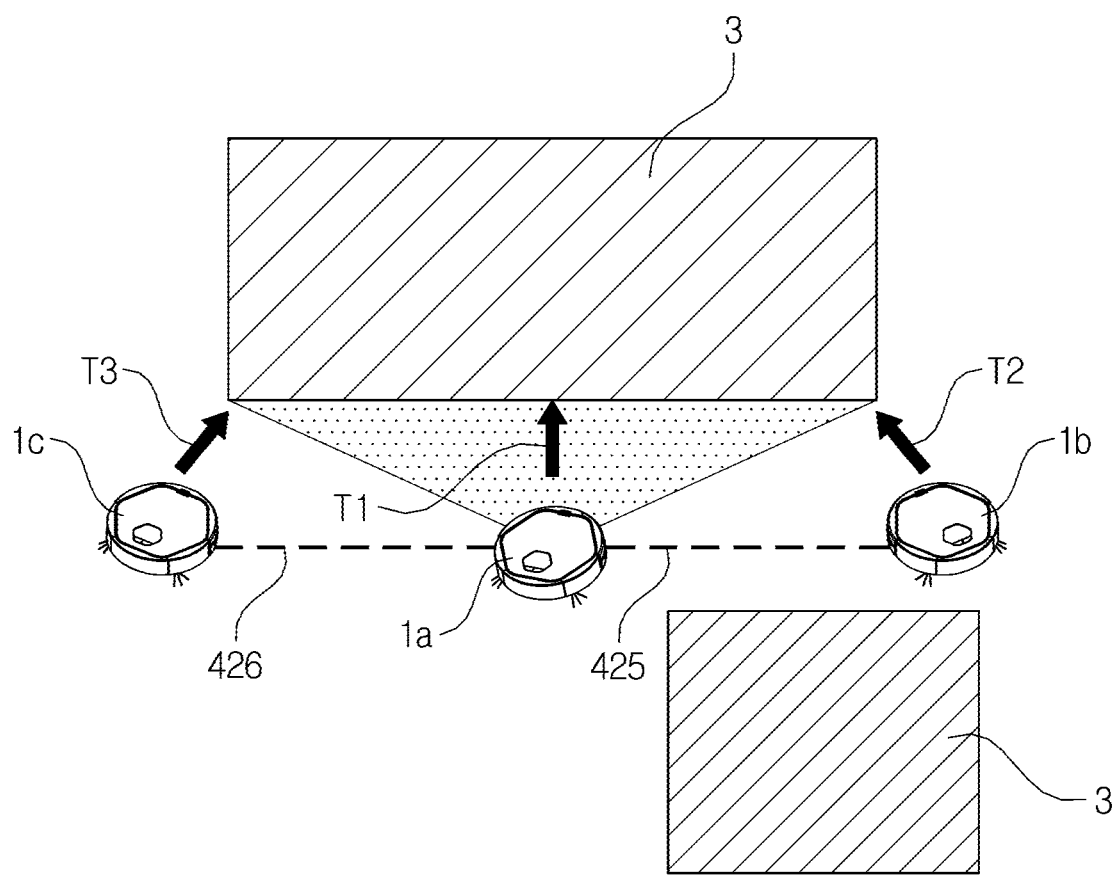

FIGS. 4 to 6 are views for explaining a movement map of an environment learning device of an autonomous mobile robot according to an embodiment of the present invention.

FIG. 4 illustrates a movement map of an environment learning device of an autonomous mobile robot according to an embodiment of the present invention.

The autonomous mobile robot stores points which are features while generating a map and also stores environment information at that point.

When the autonomous mobile robot uses a graph SLAM to generate a map, a node of the graph may be used as the feature point.

Here, simultaneous localization and map-building or simultaneous localization and mapping (SLAM) refers to a task which creates a precise map for the environment only using a sensor attached to the robot without having the help from the outside, while the robot moves around an unknown environment.

FIG. 4 illustrates node information which can be used as feature points on the map created by the graph SLAM and referring to FIG. 4, the movement map 400 is configured by a plurality of nodes 401 and 410 and a link 420.

On the movement map, each point refers to a node and a dotted line refers to an edge.

Here, the nodes 401 refers to one point where the autonomous mobile robot moves and the link 420 refers to a moving route of the autonomous mobile robot which connects the nodes.

On the route generated while the autonomous mobile robot moves between obstacles 3 present in the movement map, the feature point determining unit 110 specifies the feature point as a feature node 410, among the nodes 401 which configure the movement map and assigns numbers to the nodes in accordance to the order of specifying the feature nodes.

Here, the feature point may be at least one of a point whenever the autonomous mobile robot moves along a predetermined route, a point when the route of the autonomous mobile robot suddenly changes, and a point when the image information acquiring unit of the autonomous mobile robot faces to the center.

Further, the autonomous mobile robot located at each node moves to a first direction D1 or a second direction D2 on the route.

When the Graph SLAM is not used, the feature point may be stored whenever the robot moves by a predetermined distance or a point where a center of a space or feature points suddenly change may be stored as a feature point.

When the autonomous mobile robot recognizes an object using a 3D LiDAR, distance (range) information and reflected light (intensity) information acquired at each feature point 410 by the LiDAR, and location information of the robot are stored together.

When the autonomous mobile robot recognizes an object using an image camera, an image acquired at each feature point and the location information of the robot are stored.

The loading unit 120 loads environment information stored when the autonomous mobile robot is located at the feature node, in accordance with the order of specified feature nodes.

The data is loaded in accordance with the node number and when the object is recognized using the 3D LiDAR, the location information of the point cloud and the reflected light information of the point cloud are loaded to configure a recognizer.

FIG. 5 specifically illustrates a movement map of an environment learning device of an autonomous mobile robot according to an embodiment of the present invention.

A method of specifying a node and loading data by the environment learning device of the autonomous mobile robot according to the embodiment of the present invention will be described with reference to FIG. 5. On the route generated while the autonomous mobile robot moves between obstacles 3 in the movement map, feature points where the autonomous mobile robot moves are specified as a first feature node 411, a second feature node 412, a third feature node 413, and a fourth feature node 414 and numbers of #1, #2, #3, and #4 are assigned in accordance with the order of specifying the nodes.

It is understood that the first feature node 411 is located between the first link 421 and the second link 422 and the direction is suddenly changed from a direction L1 of the first link to a direction L2 of the second link at a corner of the object.

It is understood that the second feature node 412 is located between the second link 422 and the third link 423 and is located in the middle M of the object and the direction L3 of the second link and a direction L4 of the third link coincide.

The third feature node 413 is located between the third link 423 and the fourth link 424 and the direction is suddenly changed from a direction L5 of the third link to a direction L6 of the fourth link at a corner of the object.

Here, the feature point may be at least one of a point whenever the autonomous mobile robot moves along a predetermined route, a point when the route of the autonomous mobile robot suddenly changes, and a point when the image information acquiring unit of the autonomous mobile robot faces to the center.

Further, the autonomous mobile robot located at each node moves to the first direction D1 or the second direction D2 on the route.

The loading unit 120 loads environment information stored when the autonomous mobile robot is located at the feature node, in accordance with the order of specified feature nodes #1, #2, #3, and #4.

The environment information is loaded in accordance with the node number and when the object is recognized using the 3D LiDAR, the location information of the point cloud and the reflected light information of the point cloud are loaded to configure a recognizer.

FIG. 6 illustrates a process of acquiring image information of an autonomous mobile robot from a movement map of an environment learning device of an autonomous mobile robot according to an embodiment of the present invention.

On routes 425 and 425 which are generated while the autonomous mobile robot moves between obstacles 3 on the movement map, the image information acquiring unit of the autonomous mobile robot may photograph a front side T1 and sides T2 and T3 of the obstacle on the feature nodes 1a, 1b, and 1c.

An area S in accordance with a rotation angle of a camera may be photographed when the front side of the obstacle is seen from the feature node 1a. Thereafter, when the data is retrieved, obstacles seen from the front side and the sides are compared to specifically identify the obstacle. Further, a stationary obstacle and a moving obstacle may be compared by being compared with LiDAR data.

Figure 7:
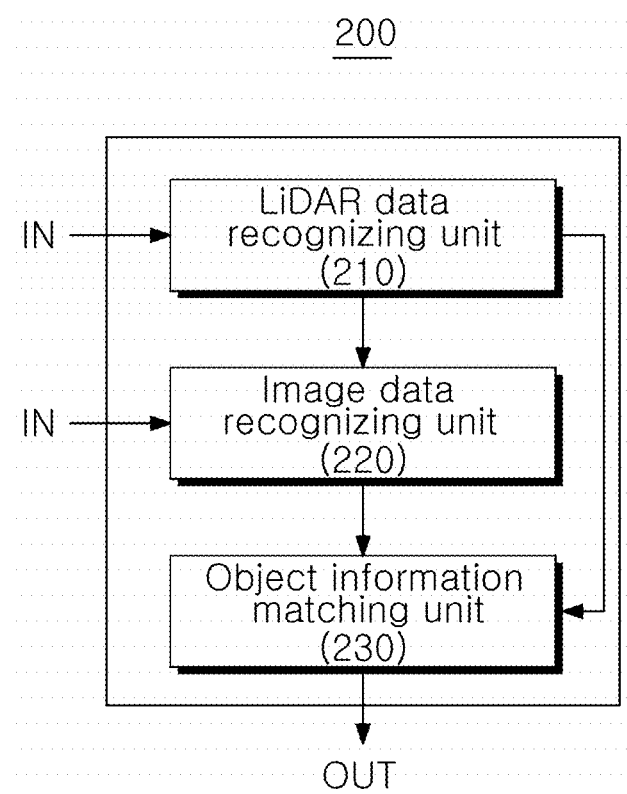
FIG. 7 is a block diagram illustrating a movement environment recognizing unit of an environment learning device of an autonomous mobile robot according to an embodiment of the present invention.

FIG. 7 is a block diagram illustrating a movement environment recognizing unit of an environment learning device of an autonomous mobile robot according to an embodiment of the present invention.

Referring to FIG. 7, a movement environment recognizing unit 200 of an autonomous mobile robot according to the embodiment of the present invention includes a LiDAR data recognizing unit 210, an image data recognizing unit 220, and an object information matching unit 230.

The movement environment recognizing unit 200 inputs converted information to a deep learning engine to perform object detection and recognition.

The movement environment recognizing unit 200 recognizes the object using the selected environment information.

Specifically, the movement environment recognizing unit 200 recognizes object information included in a surrounding environment of the feature points using a convolutional neural network (CNN) method.

The convolutional neural network (CNN) is designed to classify a new image because a layer is configured to extract a characteristic of the image from an existing neural network.

However, a model of the movement environment recognizing unit is not necessarily limited to a model trained by a convolutional neural network technique and a model trained by a different type of deep learning technique may also be used.

According to another embodiment of the present invention, the movement environment recognizing unit may be configured to include a deep learning unit to determine a filter coefficient by performing the learning in advance to determine a filter coefficient of the convolution neural network, with a feature point extracted from training data which has been classified in advance as an input. Further, the learning to determine a filter coefficient may be performed during the charging.

The LiDAR data recognizing unit 210 recognizes an object included in the surrounding environment of the feature points, based on the distance information and the reflected information loaded from the LiDAR data loading unit.

The image data recognizing unit 220 recognizes an object included in the surrounding environment of the feature points, based on the image information loaded from the image data loading unit.

The object information matching unit 230 specifically classifies the object information by comparing object information recognized by the LiDAR data recognizing unit and object information recognized by the image data recognizing unit for every coordinate of the feature node.

The object information matching unit classifies the object in consideration of a determination result in the image data recognizing unit and a determination result in the LiDAR data recognizing unit. If the determination result in the image data recognizing unit and a determination result in the LiDAR data recognizing unit are different from each other, the object may be classified in accordance with a result added by varying a weight in accordance with the situation. For example, when the lighting is dark, the object information matching unit classifies the object by assigning a higher weight to the determination result of the LiDAR data recognizing unit.

The object information matching unit 230 may classify the object further considering history information. The object information matching unit 230 combines history object information obtained by recording an object classification result within a predetermined period with at least one object information of the object information recognized by the LiDAR data recognizing unit and the object information recognized by the image data recognizing unit to classify the object. Here, the history object information may be information about an object which is completely determined within a predetermined period.

The object information matching unit 230 matches the history object information and the object information recognized by the LiDAR recognizing unit to generate first matching object information and matches the history object information and the object information recognized by the image data recognizing unit to generate second matching object information.

Thereafter, the object information matching unit 230 may classify the object according to a result obtained by adding the first matching object information and the second matching object information.

The object information matching unit 230 may further assign a weight according to an accuracy to each of the first matching object information and the second matching object information during the process of adding the first matching object information and the second matching object information.

The object information matching unit 230 assigns different weights according to a number of times of recognizing objects of the first matching object information and the second matching object information in the history object information (a counted number) and a predetermined priority of the object and then adding the first matching object information and the second matching object to classify the object.

Further, according to a location acquiring method of an object which is finally recognized, in the case of 3D LiDAR based object recognition, location information of the point cloud where the recognized object is present may be acquired directly from the input data.

In the case of the image based object recognition, it depends on whether the LiDAR is applied. Specifically, when the 3D LiDAR is mounted, the 3D LiDAR and the image match to acquire three-dimensional location information which is projected onto the image may be acquired. When the 2D LiDAR is mounted, information of a wall on the map acquired from the 2D LiDAR and image information match to match an object recognized from the image and the location information.

When the LiDAR is not applied, a location of the recognized object is estimated by matching a map created while the autonomous mobile robot moves and a location and a field of view of the robot.

Figure 8:
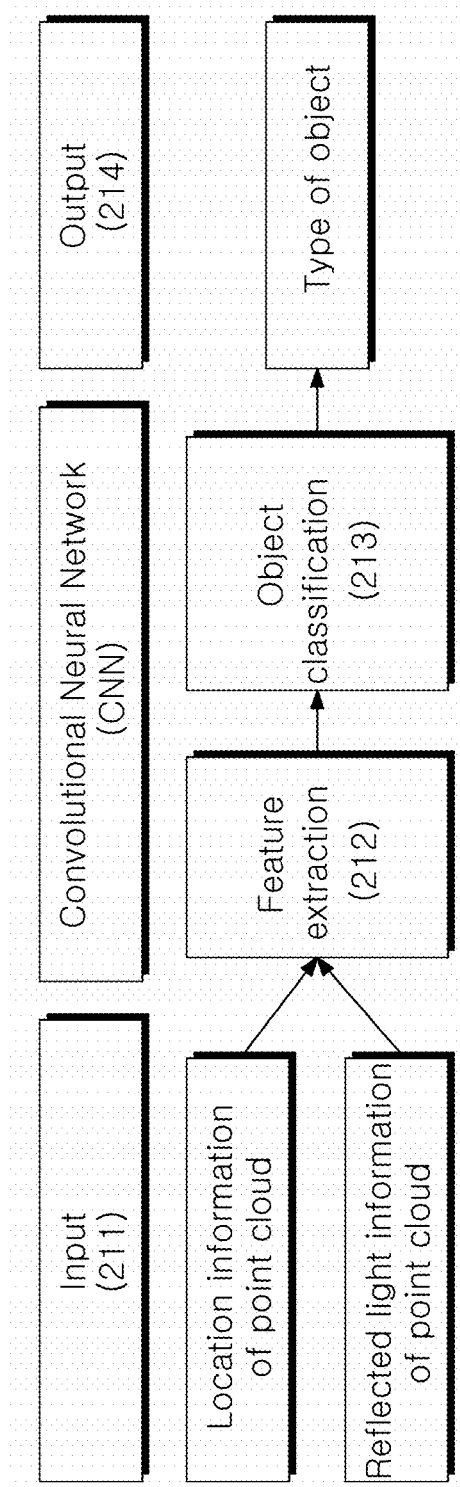
FIG. 8 is a view for explaining a LiDAR data recognizing unit of an environment learning device of an autonomous mobile robot according to an embodiment of the present invention.

FIG. 8 is a view for explaining a LiDAR data recognizing unit of an environment learning device of an autonomous mobile robot according to an embodiment of the present invention.

Referring to FIG. 8, the LiDAR data recognizing unit 210 of the autonomous mobile robot according to the embodiment of the present invention includes a first input unit 211, a first shape extracting unit 212, and a first object recognizing unit 213.

The LiDAR data recognizing unit 210 recognizes an object included in the surrounding environment of the feature points, based on the distance information and the reflected light information loaded from the LiDAR data loading unit.

The first input unit 211 receives the distance information and the reflected light information acquired from the LiDAR data loading unit.

The first shape extracting unit 212 extracts shapes of the objects included in the surrounding environment of the feature points by combining or filtering cross-sections of candidate objects from points of the point cloud data, based on the distance information and the reflected light information.

The point cloud data has a format which can be used by the LiDAR data recognizing unit 210 and may be extracted from scan information in the form of xyz or las using a drawing design/manufacturing program which can be loaded. For example, the point cloud data may include an image representing a shape which represents an outline, a shape, or a structure of a candidate object which is determined as an object.

The first shape extracting unit 212 may cut cross-sections at a plurality of predetermined reference heights to combine or filter the cross-sections. For example, as the reference heights, various heights such as 30 cm, 50 cm, and 1 m may be specified in advance and it is identified whether there is a protrusion in a medium height of the object, or there is a protrusion at a height of the top, or there is a specific object at a height of a bottom, through the filtering.

The first object recognizing unit 213 recognizes the object by classifying the shapes of the objects in accordance with an attribute, from the extracted shapes of the objects.

For example, when it is recognized that the specific object is a sofa or a doll, from the extracted shape of the objects, a type of the recognized object is output from the output unit 214 and object information in accordance with the output object is marked in the previously stored movement map.

Figure 9:
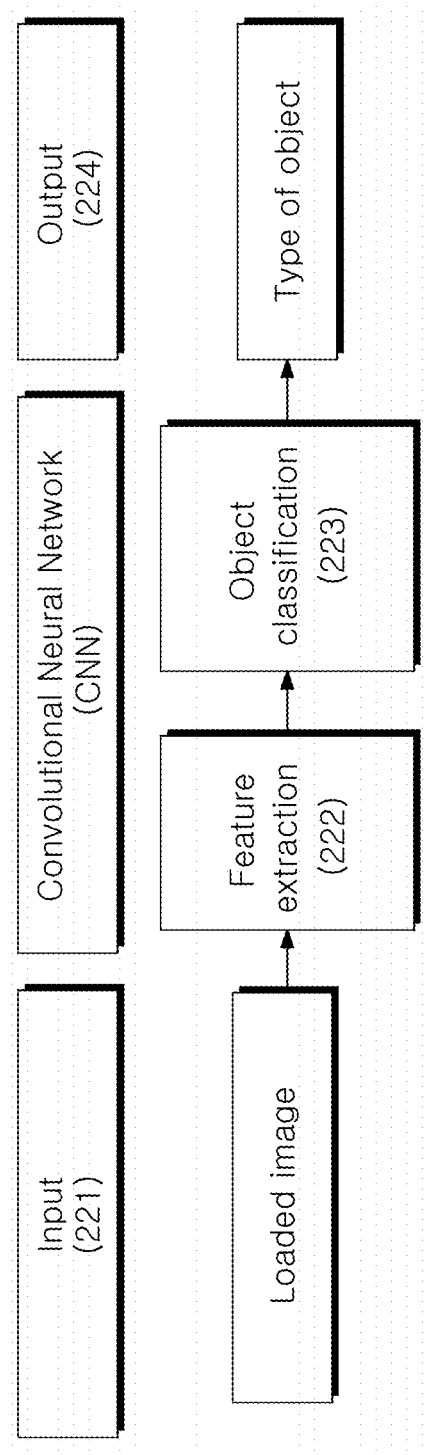
FIG. 9 is a view for explaining an image data recognizing unit of an environment learning device of an autonomous mobile robot according to an embodiment of the present invention.

FIG. 9 is a view for explaining an image data recognizing unit of an environment learning device of an autonomous mobile robot according to an embodiment of the present invention.

Referring to FIG. 9, the image data recognizing unit 220 of the autonomous mobile robot according to the embodiment of the present invention includes a second input unit 221, a second shape extracting unit 222, and a second object recognizing unit 223.

The second input unit 221 receives the image information acquired from the image data loading unit.

The second shape extracting unit 222 extracts shapes of the objects included in the surrounding environment of the feature points by combining or filtering cross-sections of candidate objects from points of the image information on the moving area included in the image information.

Cross-sections at a plurality of predetermined reference heights are cut to be combined or filtered. For example, as the reference heights, various heights such as 30 cm, 50 cm, and 1 m may be designated in advance and it is identified whether there is a protrusion in a medium height of the object, or there is a protrusion at a height of the top, or there is a specific object at a height of a bottom, through the filtering.

The second object recognizing unit 223 recognizes the object by classifying the shapes of the objects in accordance with an attribute, from the extracted shapes of the objects.

For example, when it is recognized that the specific object is a sofa or a doll, from the extracted shape of the objects, a type of the recognized object is output from the output unit 224 and object information in accordance with the output object is marked in the previously stored movement map.

The environment learning device of the autonomous mobile robot according to the embodiment of the present invention uses a 3D LiDAR and an image based object recognizing system and thus differences caused when two systems are individually used may be compensated.

For example, in the case of the 3D LiDAR, there are many input data and an order is high. Further, post-processing of outputting a type of the object and acquiring a location of the recognized object is easy. In contrast, in the case of the image based object recognizing system, the number of input data is small and the order is low. Further, a lot of computation is required for the post-processing of outputting the type of object and acquiring the location of the recognized object.

Figure 10A:
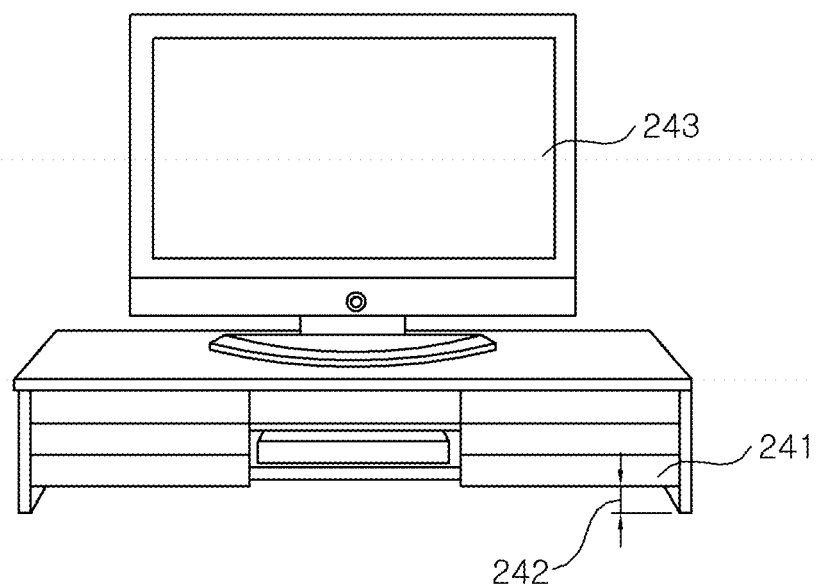
FIGS. 10A and 10B are views for explaining an object information matching unit of an environment learning device of an autonomous mobile robot according to an embodiment of the present invention.
Figure 10B:
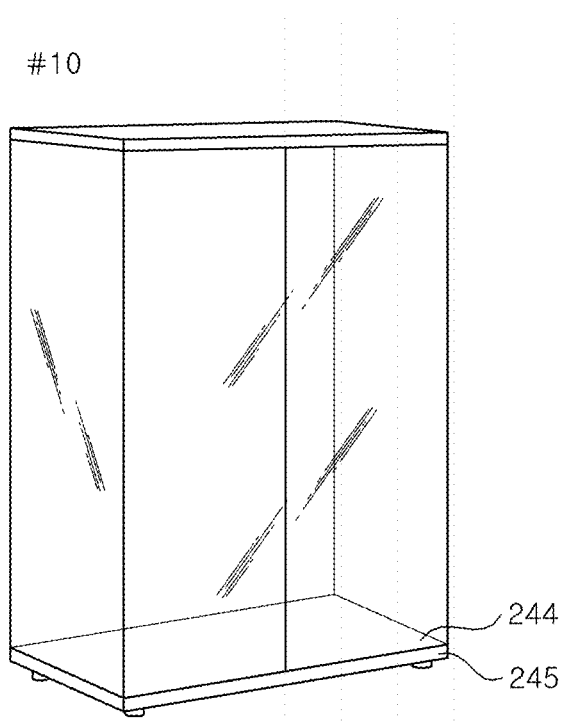

FIGS. 10A and 10B are views for explaining an object information matching unit of an environment learning device of an autonomous mobile robot according to an embodiment of the present invention.

FIG. 10A illustrates a TV and a wooden TV cabinet and FIG. 10B illustrates a cabinet made of glass.

FIGS. 10A and 10B illustrate an example acquired from a node #10 corresponding to a tenth feature node.

In FIG. 10A, the LiDAR data recognizing unit recognizes the TV cabinet 241 and a space from the TV cabinet to determine that the object is a piece of furniture with a clearance.

Further, the image data recognizing unit identifies that the object is a piece of furniture with a clearance and the inside of the cabinet is made of wood which does not reflect and the TV 243 is located on the top.

The object information matching unit matches a result of determining that the object is a cabinet corresponding to information of the furniture with a clearance recognized by the LiDAR data recognizing unit and a result of determining that the object is the wooden furniture as determined by the image data recognizing unit to specifically determine that the object which is recognized as an existing obstacle is a TV cabinet made of wood.

In FIG. 10B, the LiDAR data recognizing unit determines that there is a cabinet 245 and identifies that the cabinet is located without a clearance from the floor.

Further, the image data recognizing unit identifies that the inside of the cabinet reflects light and thus determines that it has a glass door 244 or the inside is empty.

The object information matching unit matches a result of determining that the object is a cabinet which is located without a clearance from the floor as determined by the image data recognizing unit and a result of determining that the object is the furniture made of glass as determined by the image data recognizing unit to specifically determine that the object which is recognized as an existing obstacle is a cabinet made of a glass material.

As illustrated in FIGS. 10A and 10B, even though an obstacle corresponding to the cabinet is primarily determined from the node #10, the object information may be further specifically classified using the object information matching unit of the present invention. Further, in the case of the furniture with a clearance, the autonomous mobile robot may clean the inside of the furniture depending on the height of the clearance. Further, when the object is determined as a cabinet made of a glass material, the autonomous mobile robot may be controlled to be driven by adjusting a distance to the obstacle to prevent the collision.

Further, in an environment learning device of an autonomous mobile robot according to another embodiment of the present invention, when the LiDAR data recognizing unit and the image data recognizing unit recognize a background and an actual dog or a stuffed dog, the object information matching unit may compare object information recognized by the LiDAR data recognizing unit and object information recognized by the image data recognizing unit.

For example, the object information may be classified in detail by comparing the object information for every coordinate of the feature nodes. In addition of the object information of the order #10 illustrated in FIG. 10, nodes of the order #9 and the order #11 are compared and at each node, the object information may be compared in accordance with the feature point of the image.

When the dog is recognized even at the nodes of the order #9 and the order #11, it is determined as an actual alive dog and when a side of the still stuffed dog is recognized by the image data recognizing unit, it is determined as a stuffed dog so that the movement of the autonomous mobile robot may be controlled.

The object information matching unit may classify the object by assigning weights of the object information of the LiDAR data recognizing unit and the object information recognized by the image data recognizing unit which vary depending on the situation.

For example, depending on the height, when an obstacle is recognized at a height of the top, a weight is applied to a still object and when an obstacle is recognized from the floor, a weight is applied to a moving object. Further, like an obstacle related to the object, a doghouse is recognized together with the dog, the weight is applied to the dog.

By doing this, when it is determined that there is an actual dog, a situation in which the autonomous mobile robot passes the excrement while moving may be prevented by operating an excrement detection mode which detects excrement of the dog located on the movement route.

FIGS. 11 to 14 are flowcharts illustrating an environment learning method of an autonomous mobile robot according to an embodiment of the present invention.

FIG. 11 is a flowchart illustrating an environment learning method of an autonomous mobile robot according to an embodiment of the present invention.

Referring to FIG. 11, the environment learning method of an autonomous mobile robot according to an embodiment of the present invention starts from a step S11 of docking the autonomous mobile robot to be charged.

The processor starts after the robot docks in step S11. When the autonomous mobile robot is docked to the charging station to be charged and starts charging, a process for autonomous movement of the robot is turned off and a process for object detection and recognition is turned on.

In step S12, a processor loads data acquired during the autonomous movement of the robot or a map generating process.

In step S12, data acquired during the autonomous movement or the map generating process is loaded. In this case, a three-dimensional or two-dimensional map may be used and three-dimensional or two-dimensional LiDAR data or image data may be used.

Specifically, as a type of data to be loaded, a map includes a three-dimensional or two-dimensional map, point cloud information includes distance (range) information or reflected light (intensity) information, and image or image information includes images photographed while the robot moves.

In step S13, data for every location at the moment when the robot passes one point, among the loaded data, is generated.

In step S13, data for every location is acquired to perform the object detection and recognition and a virtual robot instantaneously acquires data from information and a map such as a map which is created in advance and a LiDAR image while moving around.

Specifically, data acquired at a moment when the robot passes the location, among data acquired during the movement of the robot, is generated and the location of the robot and all data generated at that time while replaying the stored data are acquired to convert the data to perform the object detection and recognition.

In step S14, an object located at one point from the data for every location is detected and recognized.

The object detection and recognition are performed using data acquired in step S14.

Here, the converted information is input to a deep learning engine to perform the object detection and recognition.

In step S15, the location of the detected object is marked on the map and the environment learning method of the autonomous mobile robot according to the embodiment of the present invention ends.

In step S15, a location on the map is estimated by matching the recognized object and the map information and a category and information of the object are marked in the location of the object recognized on the map. Thereafter, when a process of recognizing an object for the entire map and marking on the map finishes, the process is completed.

Figure 12:
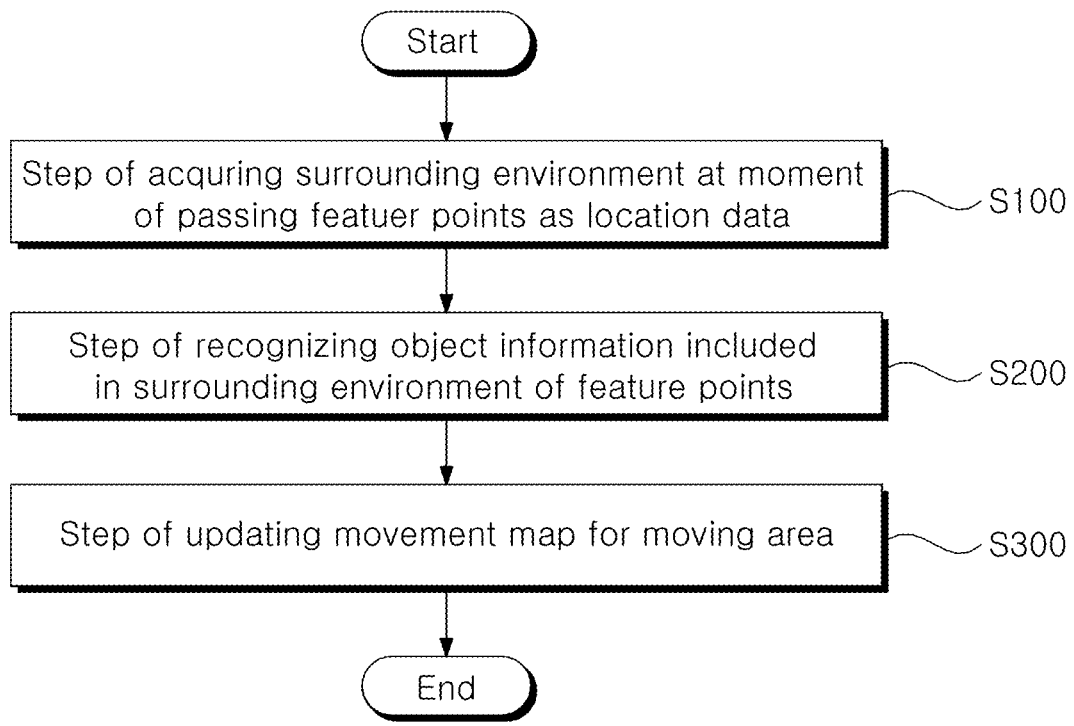

Referring to FIG. 12, the environment learning method of the autonomous mobile robot according to the embodiment of the present invention starts from a step S100 of loading selected environment information in accordance with a feature point from the memory, by the environment information acquiring unit.

In step S100, the environment information acquiring unit determines feature points to recognize an object located in the moving area using at least some of environment information and movement map information stored in the memory and loads the selected environment information in accordance with the determined feature point from the memory.

Specifically, the environment information acquiring unit 100 determines feature points for recognizing an object located in the moving area and loads selected environment information in accordance with the determined feature points from the memory, using at least some of environment information which is already acquired by the autonomous mobile robot in a state in which a power is managed by a predetermined reference or higher during the movement, the environment information and the movement map information stored in the memory 101 which stores the movement map information generated with regard to the moving area where the autonomous mobile robot moves.

The predetermined reference may be a case when the robot is being charged in the docking station, a case when a charged amount of the battery is higher than a predetermined reference, and a case when an amount of power which is higher than the reference value remains in consideration of a remaining movement route of the mobile robot which is moving.

In an embodiment of the present invention, when a charging mode command is input, it is determined as a state for learning the environment information. When the autonomous mobile robot is docked to the charging station, the charging mode command stops the moving process and starts a charging process and an algorithm of the environment learning device is performed during the charging process. When the charging mode command is transmitted from a controller (not illustrated), the charging starts and when the moving mode command is transmitted, the charging is stopped and the autonomous movement starts.

In addition to a state in which the charging mode command is input, if the power can be managed to be a predetermined reference or higher by those skilled in the art, the process of the environment learning device may be performed.

Here, the movement map information includes a plurality of nodes and links which configure the movement map related to the moving area and the environment information includes image information on the moving area acquired during the movement and distance information and reflected light information extracted from three-dimensional point cloud data acquired from an external LiDAR.

Further, the feature point may be at least one of a point whenever the autonomous mobile robot moves along a predetermined route, a point when the route of the autonomous mobile robot suddenly changes, and a point when the image information acquiring unit of the autonomous mobile robot faces to the center.

The location data is data for every location to perform object detection and recognition and the environment information acquiring unit 100 allows a virtual robot to instantaneously acquire data from information and a map such as a map which is created in advance and a LiDAR image while moving around.

In step S200, the movement environment recognizing unit recognizes the object using the selected environment information.

In step s300, the updating unit updates the movement map using the object information in accordance with the recognized object.

Specifically, the movement map is updated by matching a coordinate of the feature node of the recognized object information and a coordinate of the movement map for the moving area.

Figure 13:
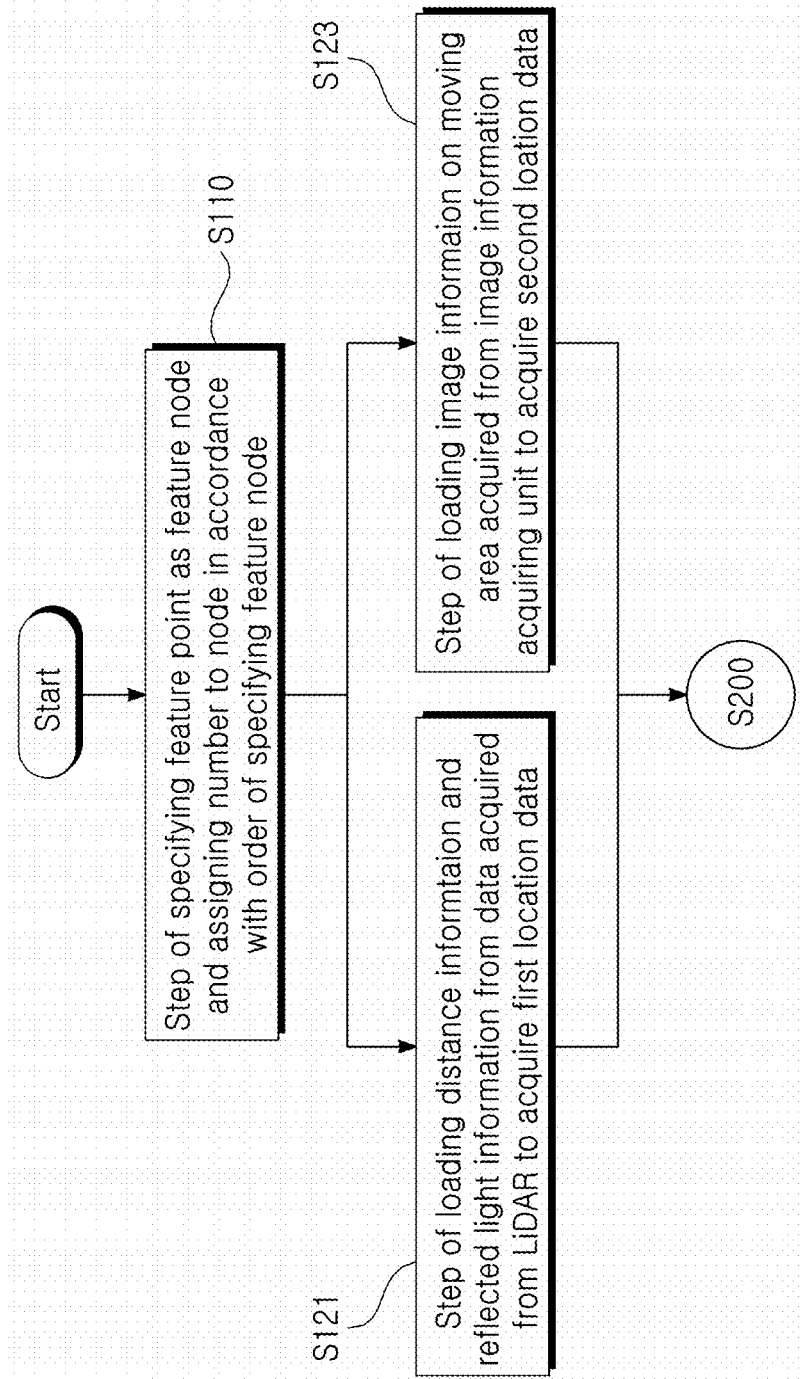

Referring to FIG. 13, in the step S100 of loading the selected environment information in accordance with the feature point from the memory, the feature point determining unit specifies the feature point as a feature node among the nodes which configure the movement map and assigns a number for every node in accordance with an order of specifying the feature node, in step S110.

Thereafter, the loading unit loads environment information stored when the autonomous mobile robot is located at the feature node, in accordance with the order of specified feature nodes.

Specifically, in step S121, the LiDAR data loading unit loads the distance information and the reflected light information extracted from three-dimensional point cloud data acquired from the LiDAR when the autonomous mobile robot is located at the feature node during the movement.

In step S123, the image data loading unit loads image information on the moving area acquired from the image information acquiring unit when the autonomous mobile robot is located in the feature node during the movement.

Figure 14:
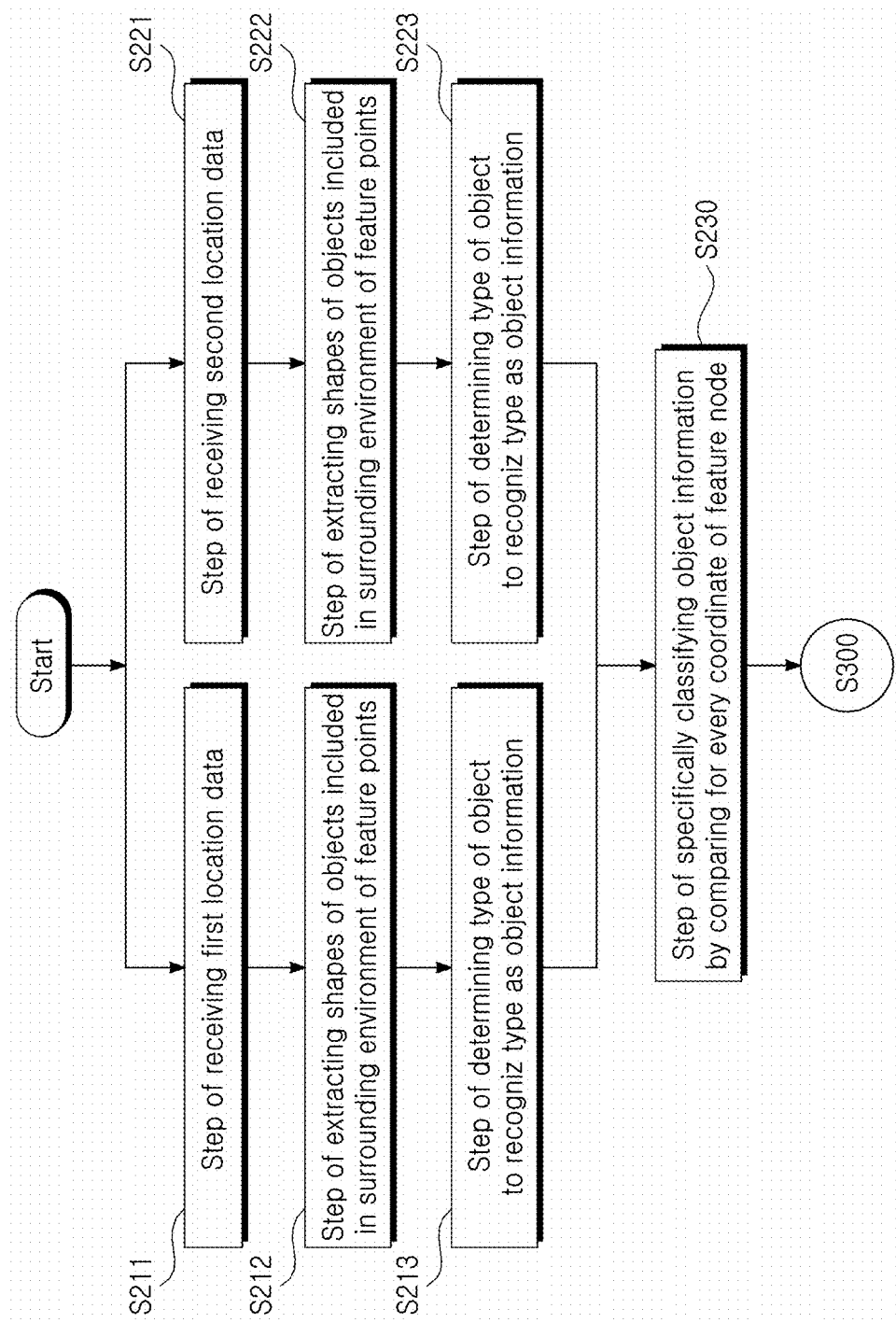

Referring to FIG. 14, in step S200 of recognizing object information included in the surrounding environment, the object information included in the surrounding environment of the feature points is recognized using the convolutional neural network (CNN) method.

In steps S211 to S213, the LiDAR data recognizing unit recognizes object information included in the surrounding environment of the feature points, based on the distance information and the reflected light information acquired from the LiDAR data loading unit.

Specifically, in step S211, the first input unit 211 receives the distance information and the reflected light information acquired from the LiDAR data loading unit.

In step S212, the first shape extracting unit 212 extracts shapes of the objects included in the surrounding environment of the feature points by combining or filtering cross-sections of candidate objects from points of the point cloud data, based on the distance information and the reflected information.

In step S213, the first object recognizing unit 213 classifies the objects in accordance with the attribute, from the extracted shape of the objects, to determine a type of objects recognized by the autonomous mobile robot and recognize it as object information.

For example, when it is recognized that the specific object is a sofa or a doll, from the extracted shape of the objects, a type of the recognized object is output from the output unit 214 and the output type of object is marked in the previously stored movement map.

In steps S221 to S223, the image data recognizing unit recognizes object information included in the surrounding environment of the feature points, based on the image information acquired from the image data loading unit.

In step S221, the second input unit 221 receives the image information acquired from the image data loading unit.

In step S222, the second shape extracting unit 222 extracts shapes of the objects included in the surrounding environment of the feature points by combining or filtering cross-sections of candidate objects from points of the image information on the moving area included in the image information.

In step S223, the second object recognizing unit 223 classifies the objects in accordance with the attribute, from the extracted shape of the objects, to determine a type of objects recognized by the autonomous mobile robot and recognize it as object information.

For example, when it is recognized that the specific object is a sofa or a doll, from the extracted shape of the objects, a type of the recognized object is output from the output unit 224 and the output type of object is marked in the previously stored movement map.

The environment learning device of the autonomous mobile robot according to the embodiment of the present invention uses a 3D LiDAR and an image based object recognizing system and thus differences when two systems are individually used may be compensated.

In step S230, the object information matching unit specifically classifies the object information by comparing object information recognized by the LiDAR data recognizing unit and object information recognized by the image data recognizing unit for every coordinate of the feature nodes.

Further, a computer readable recording medium in which a program for allowing the computer to execute the environment learning method of the autonomous mobile robot is recorded is provided.

Hereinafter, configurations of an object image generating device according to an embodiment of the present invention, an object recognizing device, and a mobile robot including the object recognizing device will be described in detail with reference to related drawings.

An object recognizing device 1500 of the present invention is installed in a mobile robot to recognize objects in the vicinity of the mobile robot to perform an operation for efficiently cleaning the vicinity, such as, a moving direction and a moving mode. Here, the mobile robot of the present invention refers to a device designed to be movable from a specific position to another position according to a predetermined method and moves from the specific position to another position using a moving unit such as wheels, rails, or walking legs. The mobile robot may collect external information using a sensor and then move according to the collected information or move using a separate manipulating unit by a user.

Examples of the mobile robot of the present invention include robot cleaners, toy cars, or mobile robots for industrial or military purposes. The mobile robot may move using wheels or walk using one or more legs, or may be implemented by a combination thereof.

The robot cleaner is a device which sucks foreign materials such as dust accumulated on a floor while moving in a cleaning space to automatically clean the cleaning space. Differently from a normal cleaner which moves by an external force provided by a user, the robot cleaner cleans the cleaning space while moving using external information or a predetermined moving pattern.

The robot cleaner may automatically move using a predetermined pattern or detect external obstacles using a detecting sensor and then moves as it is detected. Further, the robot cleaner may move in accordance with a signal transmitted from a remote control device which is manipulated by the user.

Figure 15:
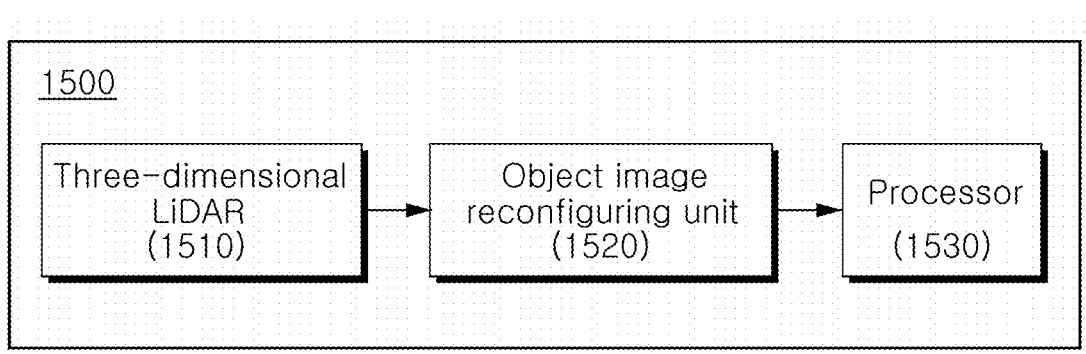
FIG. 15 is a block diagram schematically illustrating a configuration of an object recognizing device according to an embodiment of the present invention.

FIG. 15 is a block diagram schematically illustrating a configuration of an object recognizing device according to an embodiment of the present invention. Referring to FIG. 15, an object recognizing device 1500 of the present invention includes a three-dimensional LiDAR 1510, an object image reconfiguring unit 1520, and a processor 1530. Here, an object image generating device according to an embodiment of the present invention may include the three-dimensional LiDAR 1510 and the object image reconfiguring unit 1520 of FIG. 15. That is, the object recognizing device includes an object image generating device, which is a repeated concept so that the configuration of the object recognizing device will be described in more detail.

The three-dimensional LiDAR 1510 may be implemented as a laser radar having a distance range which detects distant objects, a viewing angle range such as azimuth and elevation, and an excellent spatial resolution. The LiDAR is a device which transmits a laser signal, measures a returning time of the reflected signal, and measures a distance to a reflector using a speed of light. The laser signal is converted into an electrical signal by a photo diode. The laser signal may have a predetermined wavelength band.

The three-dimensional LiDAR 1510 of the present invention transmits and receives an optical signal using a pair of light sources and a photo diode and three-dimensionally scans surroundings using a movable mirror and a rotor. The three-dimensional LiDAR 1510 may operate by a time of flight (TOF) manner.

According to the time of flight manner, a laser emits a pulsed or square wave signal to measure a time when reflection pulses or square wave signals from objects within a measurement range reach a receiver to measure a distance between an object to be measured and the distance measuring apparatus.

In the present invention, since the laser signal irradiated by the three-dimensional LiDAR 1510 is irradiated with very narrow intervals while moving vertically and horizontally, distance information in accordance with the laser signal reflected by the objects are collected to acquire three-dimensional information of a surrounding environment of the three-dimensional LiDAR.

According to an embodiment, the three-dimensional LiDAR 1510 of the present invention is installed on a top surface of the mobile robot to transmit and receive a laser signal in a predetermined periodic interval to and from the surrounding environment in a range of 360 degrees while autonomously rotating to acquire a point cloud including information about the object. Further, the mobile robot is fixed in a location where the mobile robot recognizes an object or moves at a timing for recognizing the object to transmit or receive the laser signal. The three-dimensional LiDAR will be described in more detail below with reference to FIG. 16.

The three-dimensional LiDAR 1510 may generate a point cloud which represents locations of the objects based on a laser signal (optical signal) reflected by the object. The object image reconfiguring unit 1520 may generate images representing distance information or surface information of the objects based on the point cloud.

To be more specific, the three-dimensional LiDAR 1510 generates the point cloud by representing three-dimensional location information of the objects which can be calculated from the received laser signal in the form of points. That is, the point cloud is represented by expressing the three-dimensional location information of all surrounding objects acquired by the laser signal received by the three-dimensional LiDAR 1510 as a set of countless points so that it can be expressed in a shape as if water droplets form a cloud.

The point cloud is configured by a number of measuring point groups which are densely emitted from the three-dimensional LiDAR to be reflected from the object and return to the receiver and each measuring point group has a location coordinate of x, y, and z. The three-dimensional LiDAR provides information in the form of a number of measuring points including a three-dimensional location, that is, a point cloud, by densely sampling a target surface of a distance of a space for each point with respect to the centric coordinate system. When the point cloud data provided by the three-dimensional LiDAR is three-dimensionally visualized to a remote work, the viewpoint may freely move. Further, the measurement information for the space is provided to improve the problem of the image information and when the three-dimensional printer is utilized, a three-dimensional shape may be easily constructed and manufactured.

Figure 21:
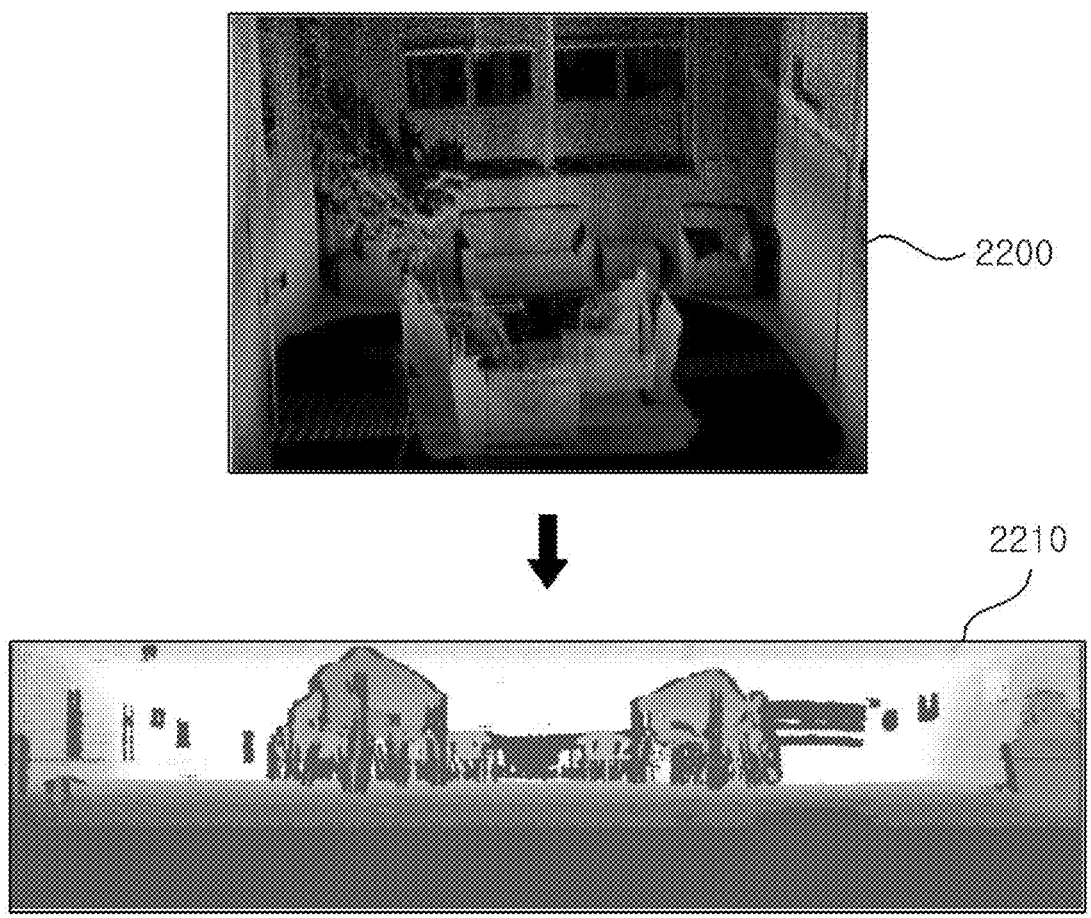
FIG. 21 is a view illustrating that a depth image is generated using a point cloud according to an embodiment of the present invention.
Figure 22:
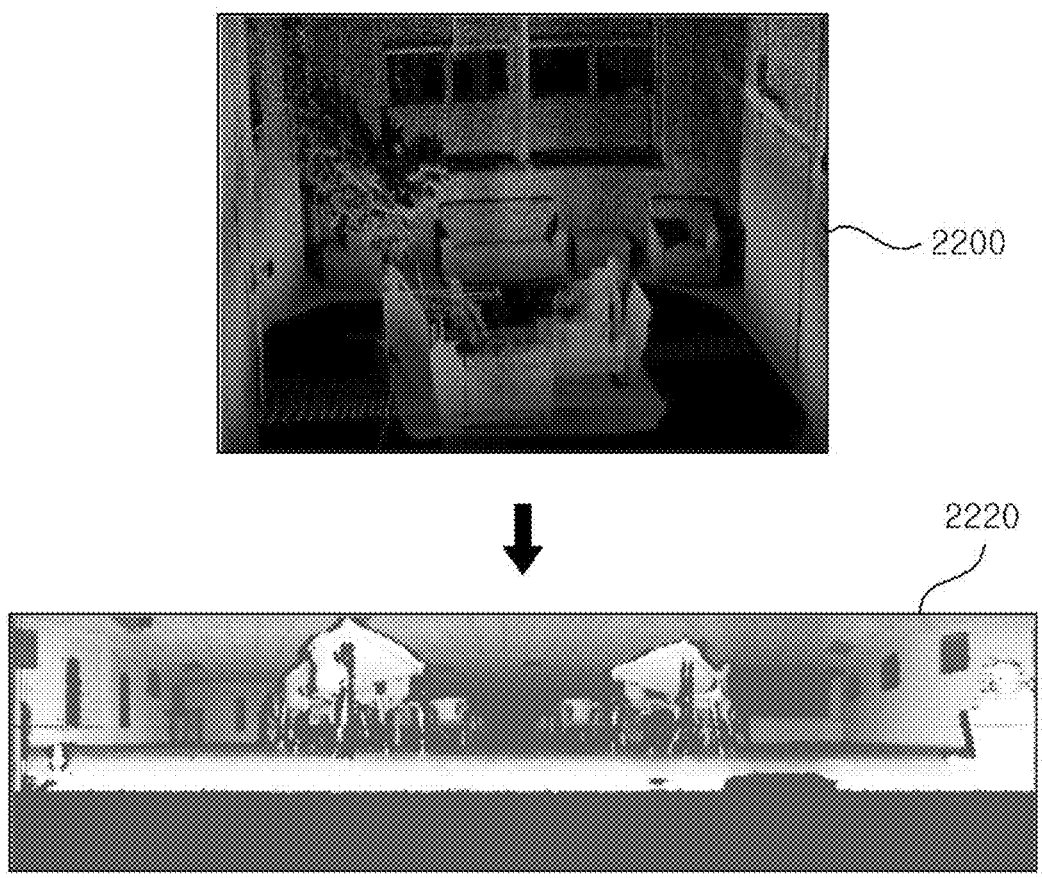
FIG. 22 is a view illustrating that an intensity image is generated using a point cloud according to an embodiment of the present invention.

The point cloud according to the embodiment of the present invention may be generated as a three-dimensional image like an image 2200 illustrated in an upper portion of FIGS. 21 and 22.

The processor 1530 may recognize the object by learning using the images generated from the object image reconfiguring unit 1520.

Figure 16:
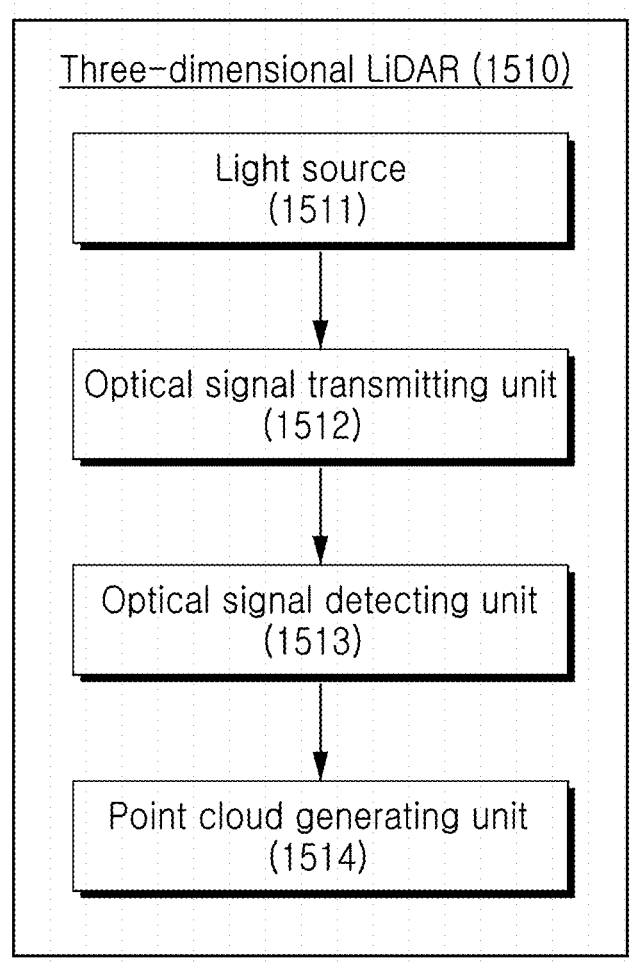
FIG. 16 is a block diagram schematically illustrating a configuration of a three-dimensional LiDAR according to an exemplary embodiment of the present invention.

FIG. 16 is a block diagram schematically illustrating a configuration of a three-dimensional LiDAR 1510 according to an embodiment of the present invention.

Referring to FIG. 16, the three-dimensional LiDAR 1510 of the present invention includes a light source 1511, an optical signal transmitting unit 1512, an optical signal detecting unit 1513, and a point cloud generating unit 1514.

The light source 1511 generates a laser signal. The optical signal transmitting unit 1512 transmits the laser signal generated from the light source 1511 to objects in the vicinity of the mobile robot with a predetermined time interval.

The optical signal detecting unit 1513 may receive a laser signal transmitted from the optical signal transmitting unit 1512 which is reflected and returns from the surrounding objects to detect a signal intensity including an amount of light of the received laser signal.

The point cloud generating unit 1514 calculates a time from a timing when the laser signal is received from the optical signal transmitting unit 1512 to a timing when the transmitted laser signal which is reflected and returns from the object is received to measure a distance from the three-dimensional LiDAR 1510 to at least one point of the object. By doing this, the point cloud generating unit 1514 generates the point cloud as an electric signal using information about the measured distance and the detected signal intensity to transmit the electric signal to the object image reconfiguring unit 1520.

Figure 17:
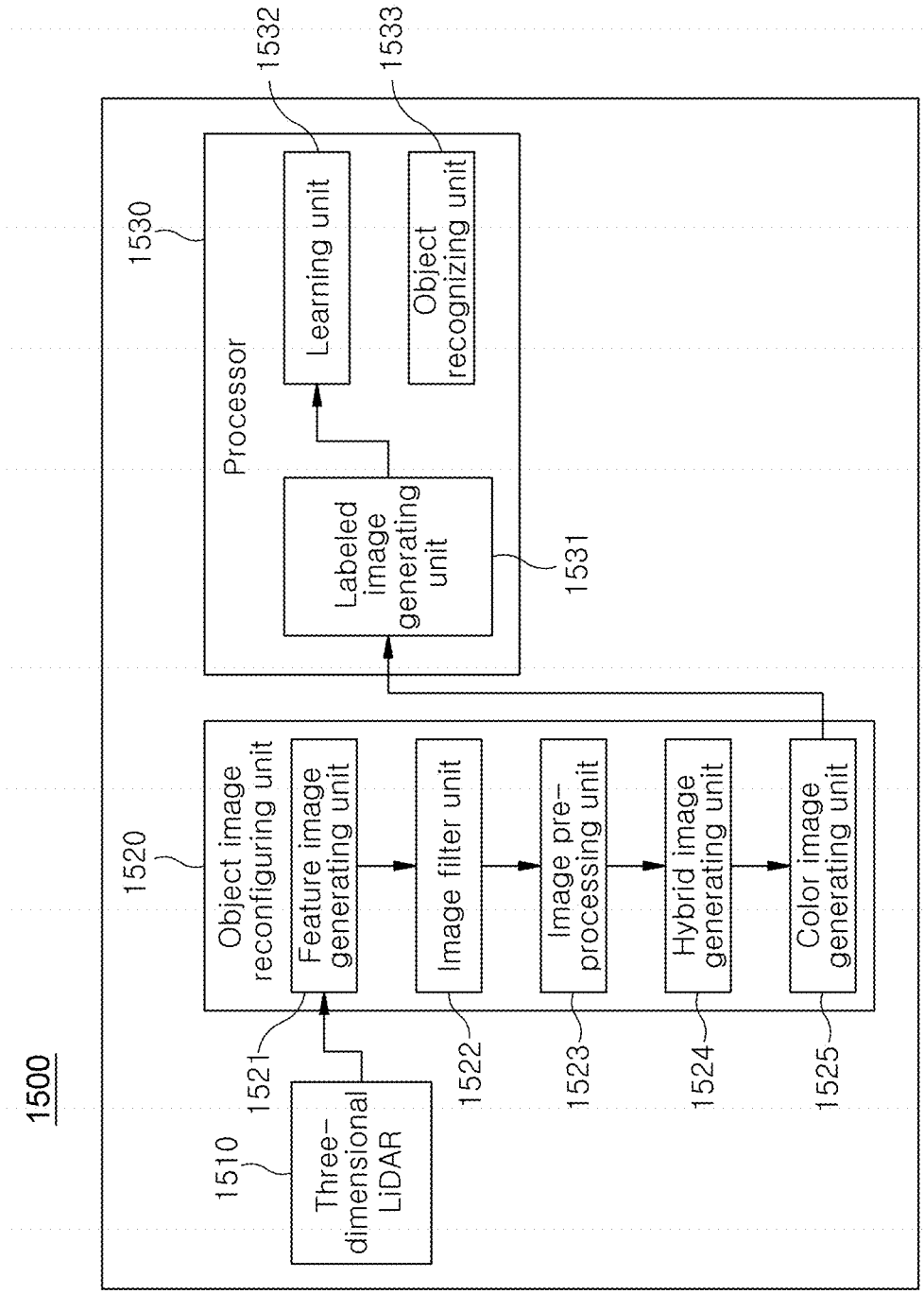
FIG. 17 is a block diagram more specifically illustrating a configuration of an object recognizing device according to another embodiment of the present invention.
Figure 18:
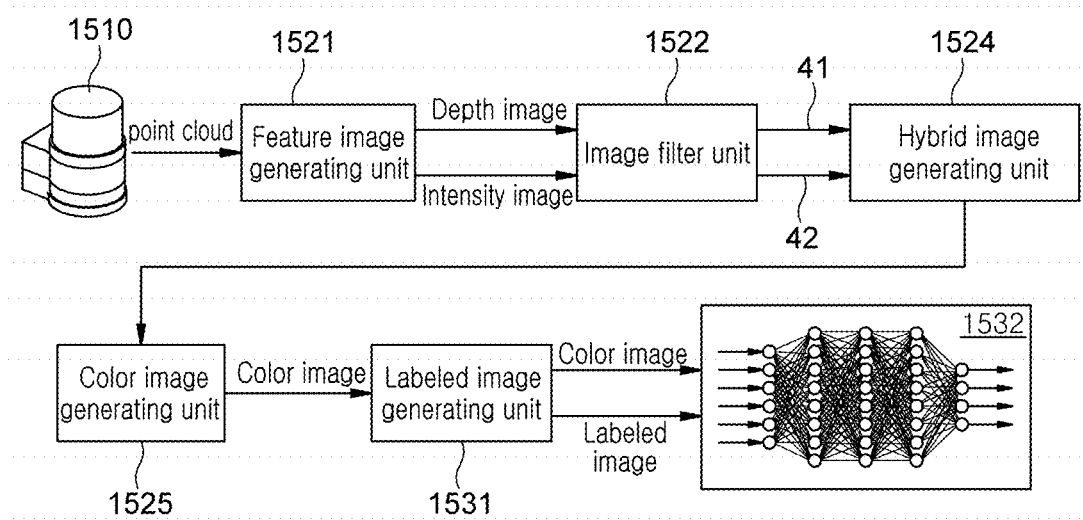
FIG. 18 is a conceptual view illustrating to explain an operation algorithm of an object recognizing device according to an embodiment of the present invention.
Figure 19:
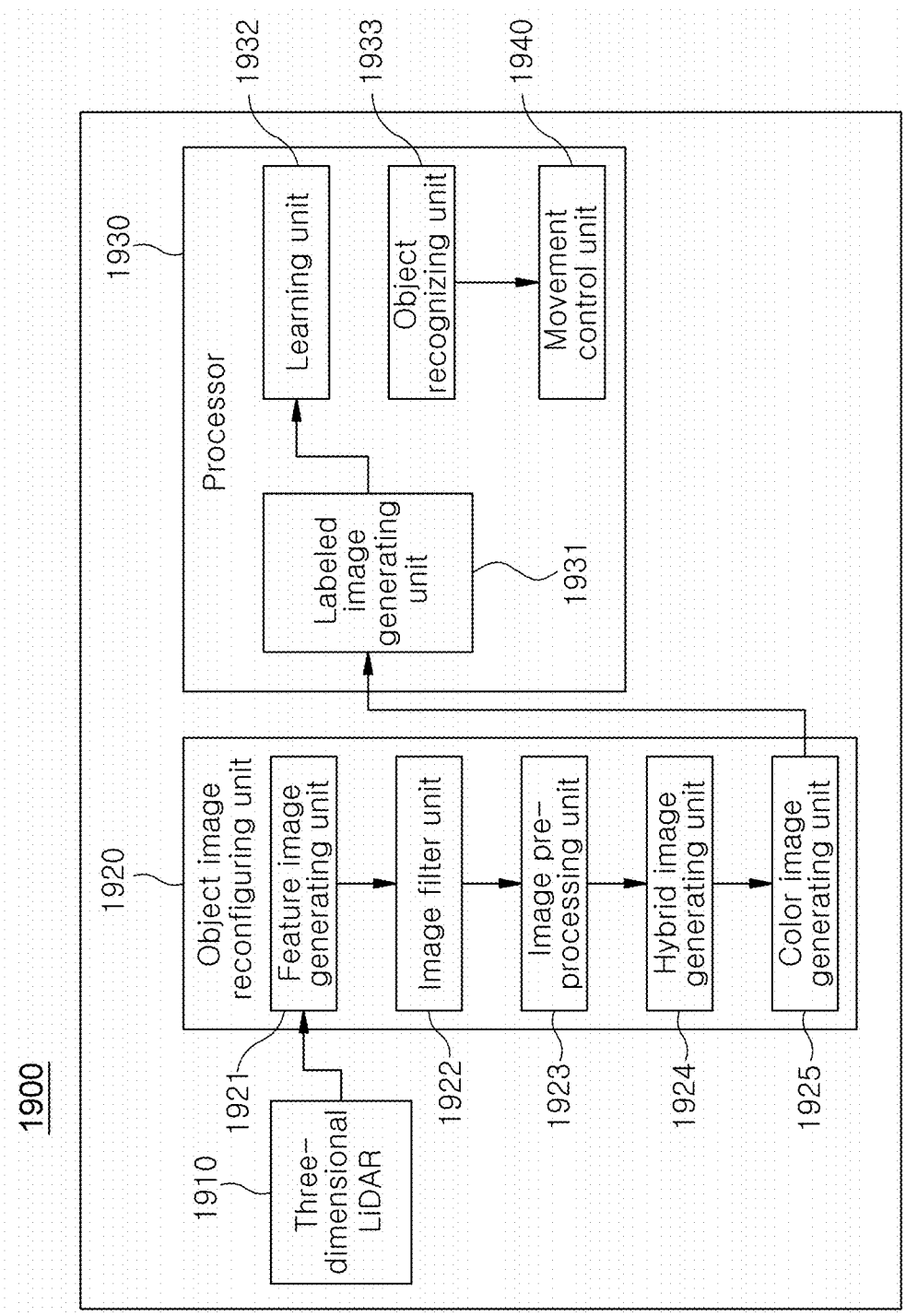
FIG. 19 is a block diagram more specifically illustrating a configuration of an object recognizing device according to still another embodiment of the present invention.
Figure 20:
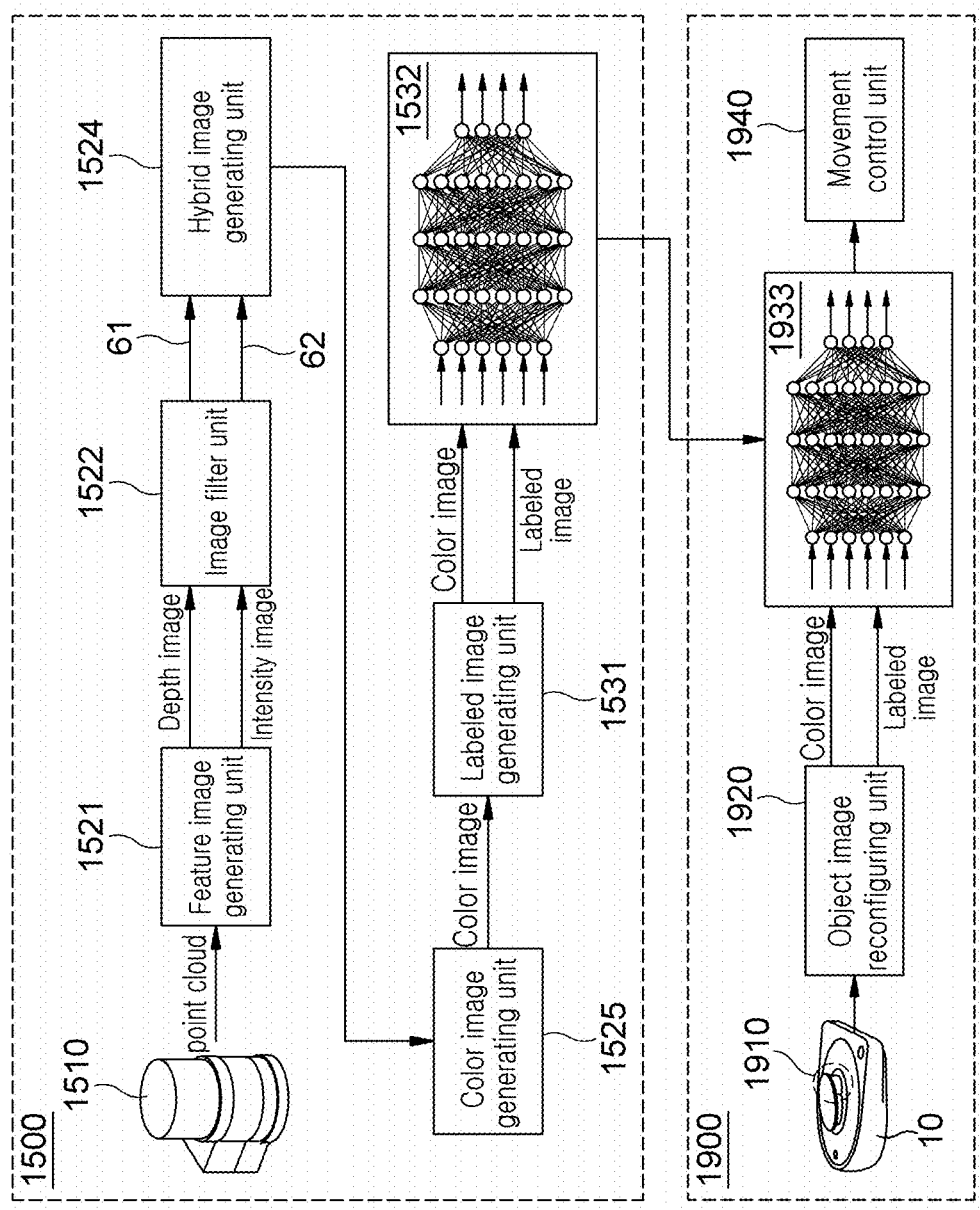
FIG. 20 is a conceptual view illustrating to explain an operation algorithm of an object recognizing device according to another embodiment of the present invention.

FIGS. 17 and 19 are block diagrams more specifically illustrating a configuration of an object recognizing device 1500 according to another embodiment of the present invention and FIGS. 18 and 20 are conceptual views illustrating to explain an operation algorithm of an object recognizing device according to an embodiment of the present invention.

To be more specific, FIGS. 17 and 18 are views illustrating an operation flow in a learning step of more effectively recognizing an object using object information acquired by the object recognizing device and FIGS. 19 and 20 are views illustrating an operation flow at a timing when the object is recognized using object information acquired in real time after completing all the learning. First, an operation of the object recognizing device 1500 in a learning step will be described with reference to FIGS. 17 and 18.

Referring to FIG. 17 which is an embodiment, the object image reconfiguring unit 1520 of the present invention includes a feature image generating unit 1521, an image filter unit 1522, an image pre-processing unit 1523, a hybrid image generating unit 1524, and a color image generating unit 1525.

The feature image generating unit 1521 may generate a plurality of images for objects in accordance with a distance to the objects and an intensity of the reflected signal using a point cloud which is transmitted as an electric signal from the three-dimensional LiDAR 1510. To be more specific, the feature image generating unit 1521 may generate a two-dimensional depth image including distance information about a distance to the object and a two-dimensional intensity image including surface information about a surface characteristic of the object.

Here, the depth image is the same meaning as a distance (range) image and has a pixel value corresponding to the distance.

The feature image generating unit 1521 according to the embodiment may generate a depth image formed of information about a distance between at least one point of the three-dimensional LiDAR 1510 and at least one point of one of the objects, by projecting the three-dimensional point cloud in the two-dimensional space.

FIG. 21 is a view illustrating that a depth image is generated using a point cloud according to an embodiment of the present invention. In FIG. 21, an image 2200 in the upper portion is a point cloud which is a three-dimensional image and an image 2100 in the lower portion is a depth image (distance image) which is a two-dimensional image.

As illustrated in the image of the lower portion of FIG. 21, the depth image of the present invention may be generated as a light gray color image, different from an image acquired by a normal camera. The image acquired by the normal camera is generated by sensing color reflected by visible ray, but the depth image of the present invention may express the distance between the three-dimensional LiDAR 1510 and the object with colors. In other words, the depth image of the present invention may be an image in which the distance measured by the three-dimensional LiDAR 1510 is expressed by a pixel value representing the brightness of each pixel. Here, a color of the depth image may be expressed based on a gray level, but is not necessarily limited thereto.

For example, the feature image generating unit 1521 may determine each pixel value of a depth image corresponding to a location of at least one point of the object in accordance with a distance between at least one point of the three-dimensional LiDAR 1510 and at least one point of each object. That is, a color of the depth image of the present invention may be determined in accordance with a distance to the object, like the image 2210 of the lower portion of FIG. 21.

Further, the feature image generating unit 1521 according to the embodiment may generate an intensity image formed by information for object surface features by projecting the point cloud into a two-dimensional space, in consideration of intensities of a laser signal which is reflected and returns from at least one point of one of the objects included in the three-dimensional point cloud. In other words, the intensity image of the present invention may be an image in which an intensity of a reflected signal which is reflected by the object to return is expressed by a pixel value representing a brightness of each pixel. Here, a color of the intensity image may be expressed based on a gray level, but is not necessarily limited thereto.

FIG. 22 is a view illustrating that an intensive image is generated using a point cloud according to an embodiment of the present invention. In FIG. 22, an image 2200 in the upper portion is a point cloud which is a three-dimensional image and an image 2220 in the lower portion is an intensity image which is a two-dimensional image.

The intensity image according to the embodiment represents information which is similar to an image acquired by a normal camera. However, the laser signal which is transmitted and received by the three-dimensional LiDAR 1510 of the present invention uses a band of an infrared ray, rather than a visible ray band so that the intensity image is represented as an image which is different from an image acquired by a normal camera.

The depth image of the present invention represents surrounding objects only with distances from the objects so that a feature of the object surface cannot be found. In contrast, in the intensity image of the present invention as described above, information of the transmitted laser signal which is reflected and returns from the surface of each object is reflected as it is so that all the features of the object surface may be represented like the visible ray image.

For example, the intensity image is data obtained by converting an intensity of the laser signal which is reflected from the object surface to return into an image so that an object surface with good reflection may be represented with a bright value and an object surface with poor reflection may be represented with a dark value.

The image converting unit 1521 generates a depth image and an intensity image obtained by converting a point cloud which is a three-dimensional image into a two-dimensional image by mapping pixel unit signal values which form the three-dimensional point cloud onto a two-dimensional plane.

Referring to FIG. 18 again, as described above, the feature image generating unit 1521 transmits the depth image and the intensity image to the image filter unit 1522 after generating the depth image (range image) and the intensity image for the object, based on the object information.

Accordingly, the image filter unit 1522 according to the embodiment of the present invention removes an image noise of the depth image and the intensity image which are transmitted. Here, the image filter unit 1522 of the present invention may be implemented as a median filter.

When the laser signal transmitted from the three-dimensional LiDAR 1510 is not reflected and does not return from the object, if an image is generated without receiving a laser signal for a partial area, information included in the depth image and the intensity image is lost. Therefore, the depth image and the intensity image generated based on the three-dimensional point cloud appear as if black dots are scattered across the images. Therefore, the image filter unit 1522 of the present invention filters the depth image and the intensity image using a noise processing to improve the quality of the information included in the depth image and the intensity image.

As illustrated in FIG. 17, after filtering the noise of the depth image and the intensity image, the image filter unit 1522 transmits the depth image and the intensity image from which the noise is filtered to the image pre-processing unit 1523.

The image pre-processing unit 1523 uniformly distributes pixel values of the depth image and the intensity image which are filtered to process each image. The image pre-processing unit 1523 according to the embodiment performs histogram equalization on the depth image and the intensity image which are filtered to allow the process 1530 to easily distinguish the object later to output an image with an improved image quality by uniformly distributing the distribution of the pixel values of the images.

The image pre-processing unit 1523 transmits the depth image and the intensity image which are processed to the hybrid image generating unit 1524. The hybrid image generating unit 1524 generates a hybrid image to allow the color image generating unit 1525 to generate a color image.

In other word, the depth image and the intensity image which is processed by the image pre-processing unit 1523 are image information formed of one image so that the depth image and the intensity image are generated as a black and white image (gray images). In this case, it is important that the color image is generated only by combining three images RGB each formed of single information. That is, two images are generated by the feature image generating unit 1521 so that the one another image needs to be generated using the two generated images.

That is, in order to generate the color image by the color image generating unit 1525, another image which includes the same information as the depth image and the intensity image is necessary in addition to the depth image and the intensity image.

Figures 23, 24:
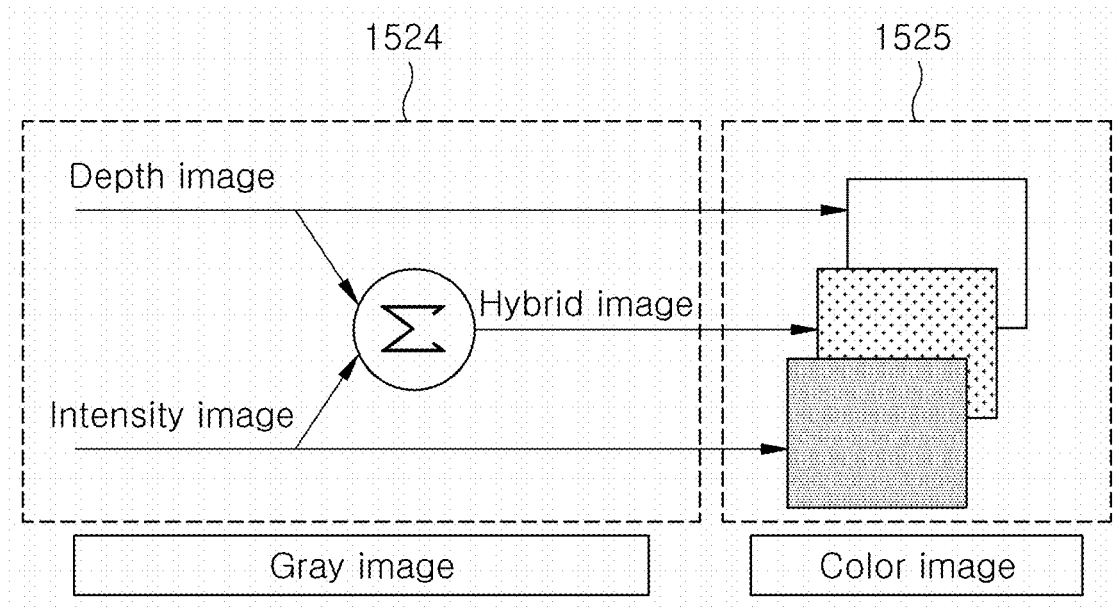
FIG. 23 is a reference view illustrating a process of generating a color image according to an embodiment of the present invention.
FIG. 24 is a view illustrating an algorithm which generates the above-described color image.

FIG. 23 is a reference view illustrating a process of generating a color image according to an embodiment of the present invention. Referring to FIG. 23, the hybrid image generating unit 1524 of the present invention generates a hybrid image by convoluting pixel information configured by the depth image which is processed by the image pre-processing unit 1523 and pixel information configured by the intensity image. The hybrid image generated as described above may be generated as a black and white (gray) image, similarly to the depth image and the intensity image.

Accordingly, the color image generating unit 1525 of the present invention may generate a new color image by combining the generated hybrid image and the depth image and the intensity image which are processed.

Specifically, the color image generating unit 1525 may generate a color image by setting a pixel value of the depth image, a pixel value of the hybrid image, and a pixel value of the intensity image in the same pixel position (pixel coordinate) to values expressing the brightness of red, green, and blue.

The color image generating unit 1525 assigns the pixel value of the depth image as a color channel of red, assigns the pixel value of the hybrid image as a color channel of green, and the pixel value of the intensity image as a color channel of blue, but is not necessarily limited thereto.

For example, the color image generating unit 1525 may sequentially assign the pixel values to the color channels in the order of red, green, blue, according to the magnitudes of the pixel values of the pixel value of the depth image, the pixel value of the hybrid image, and the pixel value of the intensity image or assign the pixel values to the color channels based on a predetermine rule or a random function.

As described above, the hybrid image is generated by the hybrid image generating unit 1524, using the depth image and the intensity image which are processed. In FIG. 18 which is another embodiment, it is illustrated that the depth image and the intensity image which are processed by the image pre-processing unit 1523 are directly transmitted to the color image generating unit 1525. However, the hybrid image generating unit 1524 of the present invention, as illustrated in FIG. 18, is provided as a configuration included in the color image generating unit 1525 so that the hybrid image generating unit may be implemented to generate a color image after generating the hybrid image by the color image generating unit 1525. Further, as illustrated in FIG. 17, the hybrid image generating unit 1524 may also be implemented to be provided separately from the color image generating unit 1525.

FIG. 24 is a view illustrating an algorithm which generates the above-described color image. In FIG. 24, [j] and [i] refer to j-th pixel and an i-th pixel in a combined image.

Figure 25:
FIG. 25 is a view illustrating a color image generated by the above-described process.

FIG. 25 is a view illustrating a color image generated by the above-described process.

Referring to FIG. 17 again, the processor 1530 of the present invention may be configured to include a labeled image generating unit 1531, a learning unit 1532, and an object recognizing unit 1533.

The labeled image generating unit 1531 of the present embodiment receives a color image generated by the color image generating unit 1525 and generates a labeled image in which at least one point of the received color image is labeled.

The processor 1530 performs the learning to satisfactorily recognize the objects in the vicinity of the mobile robot. In this case, in order to smoothly perform the learning, a portion specified by the user is represented in the color image which is input data to represent a portion to be found from the input image by the artificial neural network.

For example, the labeled image may be an image which further includes labeled object information obtained by labeling a specific object (for example, a chair or a table) desired by the user in the color image.

The labeled image generating unit 1531 transmits the generated labeled image and the color image to the learning unit 1532 and the learning unit 1532 inputs the color image and the labeled image which are transmitted to an artificial neural network provided therein to recognize the objects through the artificial neural network.

Figure 26:
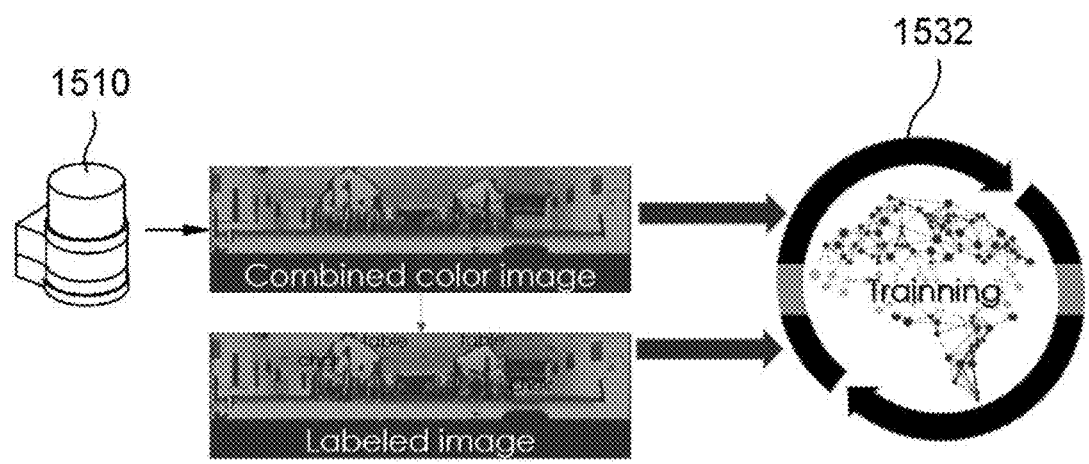
FIG. 26 is a view illustrating input images which are input to an artificial neural network of a process according to an embodiment of the present invention.

FIG. 26 is a view illustrating input images which are input to an artificial neural network of a process according to an embodiment of the present invention. Referring to FIG. 26, the labeled image which is generated using the color image may be generated as an image like the color image.

Referring to FIG. 17 again, the learning unit 1532 of the processor of the present invention receives the color image and the labeled image to perform the learning. That is, the learning unit 1532 receives the color image and the label image in which an object to be recognized by the object recognizing device 1500 is labeled in the color image to perform the learning.

The learning unit 1532 of the present invention according to the embodiment may learn the color image and the labeled image using an artificial neural network configured as a deep neural network (DNN). For example, the artificial neural network of the learning unit of the present invention may be implemented as one of a convolution neural network (CNN), a recurrent neural network (RNN), and a generative adversarial network (GAN). In this specification, it is assumed that the artificial neural network of the learning unit 1532 is implemented by the convolution neural network (CNN) to perform the learning.

The learning unit 1532 according to the embodiment includes an encoding unit, a convolution neural network (artificial neural network), and a decoding unit.

The encoding unit receives the color image and the labeled image to encode the color image and the labeled image which are received to convert the color image and the labeled image into input feature vectors. Here, the input feature vector refers to a vector matrix which represents a feature of each image.

The convolution neural network is configured by an input layer configured of input nodes, a hidden layer configured of a plurality of hidden nodes which learns using the input color image and label information, and an output layer configured of output nodes which output a learning result to perform the learning. Here, the hidden layers converts the input feature vectors into output feature vectors by performing the convolution using each input feature vector output from each input node of the input layer, weights set between the nodes, and a bias value for each node.

The decoding unit decodes the output feature vector (vector matrix) which is a learning result output from the convolution neural network to calculate a result of recognizing the object based on the input image information. For example, the recognition result may be a definition (name) of the object included in the input image information, a number of objects, a location of the object, and a size of the object.

FIGS. 19 and 20 illustrate an operation flow at a timing when the object is recognized using object information acquired in real time after completing all the learning as mentioned above.

The object recognizing unit 1933 of the object recognizing device 1900 of FIGS. 19 and 20 recognizes the objects currently in the vicinity of the robot based on the point cloud generated from the three-dimensional LiDAR 1910 installed at the top of the mobile robot 10, using a neural network including layers in which optimal weights between layers of the artificial neural network determined by the learning process of the learning unit 1932 for recognizing an object are set.

The object recognizing device 1900 of FIG. 20 which is an embodiment of the present invention may be configured to further include a movement control unit 1940. The movement control unit 1940 controls a moving direction and a moving mode of the mobile robot 10 in consideration of a location of an object in the surrounding environment recognized from the object recognizing unit 1933.

As a more specific example, the movement control unit 1940 generates a map for a predetermined space, for example, an entire area of a home, a public organization, or an office to be cleaned while moving based on data about an object recognized by the object recognizing unit 1933 and controls an operation unit which performs a cleaning operation to automatically clean an area to be cleaned by sucking foreign materials such as dust, from a floor, while moving in an area to be cleaned by itself without manipulation of the user, based on the previously generated map.

FIG. 27 is a flowchart illustrating an object image generating method according to an exemplary embodiment of the present disclosure in accordance with a time flow.

First, in step S2701, the three-dimensional LiDAR 1510 transmits a laser signal (optical signal) to the surrounding object and receives a reflected optical signal reflected by the object. In step S2702, the three-dimensional LiDAR 1510 generates a point cloud in accordance with a reflected optical signal. When the generation of the point cloud ends, the three-dimensional LiDAR 1510 transmits the generated point cloud to the object image reconfiguring unit 1520 in step S2703.

In step S2704, the object image reconfiguring unit 1520 generates a depth image and an intensity image by projecting at least a part of the point cloud into a predetermined space in accordance with the distance to the object and the intensity of the reflected optical signal.

In step S2705, the object image reconfiguring unit 1520 mixes the depth image and the intensity image which are generated to generate a hybrid image and in step S2706, generates a color image which is reconfigured by combining the depth image, the intensity image, and the hybrid image.

The more specific description of the object image generating method has been described in detail with reference to FIGS. 15 to 26 so that a redundant description will be omitted below.

The object recognizing device of the present invention and a mobile robot including the same as described above convert three-dimensional information acquired from a 3D LiDAR into two-dimensional information to reduce a dimension of the information so that a computational amount and speed which can be driven even in a device with a small computational capacity such as a home cleaning robot may be ensured.

Even though it has been described above that all components of the exemplary embodiment of the present invention are combined as one component or operate to be combined, the present invention is not limited to the exemplary embodiment. In other words, one or more components may be selectively combined to be operated within a scope of the present invention. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present invention. The recording media of the computer program may include a magnetic recording medium or an optical recording medium.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. An environment learning device of an autonomous mobile robot, comprising:
    a memory which stores environment information which is already acquired by an autonomous mobile robot in a state in which a power is managed to be a predetermined reference or higher and movement map information generated with respect to a moving area where autonomous mobile robot moves;
    an environment information acquiring unit which determines feature points to recognize an object located in the moving area using at least some of the environment information and the movement map information stored in the memory and loads the selected environment information in accordance with the determined feature point from the memory;
    a movement environment recognizing unit which recognizes the object using the selected environment information; and
    an updating unit which updates the movement map using object information in accordance with the recognized object.

2. The environment learning device of claim 1, wherein the movement map information includes a plurality of nodes and a link which configure the movement map regarding the moving area and
    the environment information includes image information on the moving area acquired during the movement; and three-dimensional point cloud data in accordance with a reflected optical signal reflected by an object acquired from an external LiDAR.

3. The environment learning device of claim 2, wherein the feature point is at least one of a point whenever the autonomous mobile robot moves along a predetermined route, a point when a direction of the autonomous mobile robot is changed, and a point previously determined to recognize the object.

4. The environment learning device of claim 2, wherein the environment information acquiring unit includes:
- a feature point determining unit which determines a feature point to recognize an object located in the moving area using at least some of the environment information and the movement map information stored in the memory; and
- a loading unit which loads selected environment in accordance with the determined feature point from the memory.

5. The environment learning device of claim 4, wherein the feature point determining unit specifies the feature point as a feature node, among nodes which configure the movement map and assigns numbers to nodes in accordance to an order of specifying the feature nodes and the loading unit loads environment information stored when the autonomous mobile robot is located at the feature node, in accordance with an order of the specified feature nodes.

6. The environment learning device of claim 5, wherein the loading unit includes:
- a LiDAR loading unit which loads distance information and reflected light information extracted from point cloud data acquired from the LiDAR when the autonomous mobile robot is located at the feature node during the movement; and
- an image data loading unit which loads image information on the moving area acquired from the image information acquiring unit when the autonomous mobile robot is located at the feature node during the movement.

7. The environment learning device of claim 6, wherein the movement environment recognizing unit includes:
- a LiDAR data organizing unit which recognizes an object included in the surrounding environment of the feature points, based on the distance information and the reflected light information loaded from the LiDAR data loading unit; and
- an image data recognizing unit which recognizes an object included in the surrounding environment of the feature points, based on the image information loaded from the image data loading unit.

8. The environment learning device of claim 7, wherein the LiDAR data recognizing unit includes:
- a first input unit which receives the distance information and the reflected light information acquired from the LiDAR data loading unit;
- a first shape extracting unit which extracts shapes of the objects included in the surrounding environment of the feature points by combining or filtering cross-sections of candidate objects from points of the point cloud data, based on the distance information and the reflected light information; and
- a first object recognizing unit which classifies the shapes of the objects in accordance with attributes from the extracted shapes of the objects to recognize the object.

9. The environment learning device of claim 7, wherein the image data recognizing unit includes:
- a second input unit which receives the image information acquired from the image data loading unit;
- a second shape extracting unit which extracts shapes of the objects included in the surrounding environment of the feature points by combining or filtering cross-sections of candidate objects from points of the image information on the moving area included in the image information; and
- a second object recognizing unit which classifies the shapes of the objects in accordance with attributes from the extracted shapes of the objects to recognize the object.

10. The environmental learning device of claim 7, wherein the movement environment recognizing unit further includes:
- an object information matching unit which specifically classifies the object information by comparing object information recognized by the LiDAR data recognizing unit and object information recognized by the image data recognizing unit for every coordinate of the feature nodes.

11. An environment learning method of an autonomous mobile robot, comprising:
- determining feature points to recognize an object located in the moving area using at least some of environment information and movement map information stored in the memory and loading selected environment information in accordance with the determined feature point from a memory, by an environment information acquiring unit;
- recognizing the object using the selected environment information, by a movement environment recognizing unit; and
- updating the movement map using object information in accordance with the recognized object, by an updating unit.

* * * * *